(12) United States Patent
Lu

(10) Patent No.: US 10,901,155 B2
(45) Date of Patent: Jan. 26, 2021

(54) MULTI-FIBER OPTICAL CONNECTOR HAVING ENHANCED FUNCTIONALITY

(71) Applicant: CommScope Technologies LLC, Hickory, NC (US)

(72) Inventor: Yu Lu, Eden Prairie, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/445,487

(22) Filed: Jun. 19, 2019

(65) Prior Publication Data

US 2019/0384017 A1 Dec. 19, 2019

Related U.S. Application Data

(60) Provisional application No. 62/687,163, filed on Jun. 19, 2018.

(51) Int. Cl.
*G02B 6/38* (2006.01)

(52) U.S. Cl.
CPC ......... *G02B 6/3831* (2013.01); *G02B 6/3882* (2013.01)

(58) Field of Classification Search
CPC ...... G02B 6/381; G02B 6/3831; G02B 6/387; G02B 6/3882; G02B 6/3893
USPC .............................................. 385/78, 80, 81
See application file for complete search history.

(56) References Cited

U.S. PATENT DOCUMENTS

| | | | |
|---|---|---|---|
| 6,450,697 B1 | 9/2002 | Ngo | |
| 7,036,993 B2 | 5/2006 | Luther et al. | |
| 7,717,625 B2 | 5/2010 | Margolin et al. | |
| 8,636,424 B2 | 1/2014 | Kuffel et al. | |
| 8,757,894 B2 | 6/2014 | Katoh | |
| 8,770,863 B2 | 7/2014 | Cooke et al. | |
| 8,894,298 B2 | 11/2014 | Wakjira et al. | |
| 9,091,825 B2 | 7/2015 | Takahashi et al. | |
| 9,122,022 B2 | 9/2015 | Wakjira et al. | |
| 9,442,256 B2 | 9/2016 | Kuffel et al. | |
| 9,638,872 B2 | 5/2017 | Kuffel et al. | |
| 9,658,409 B2 | 5/2017 | Gniadek et al. | |
| 9,684,139 B2 * | 6/2017 | Chang | G02B 6/3826 |
| 9,778,425 B2 | 10/2017 | Nguyen et al. | |
| 9,798,094 B2 | 10/2017 | Kuffel et al. | |
| 9,817,194 B2 | 11/2017 | Childers et al. | |
| 9,823,424 B2 | 11/2017 | Krawczyk et al. | |
| 9,829,645 B2 | 11/2017 | Good et al. | |
| 9,880,361 B2 | 1/2018 | Childers et al. | |
| 9,977,199 B2 | 5/2018 | Chang et al. | |
| 10,215,932 B2 | 2/2019 | Childers et al. | |
| 2012/0099822 A1 | 4/2012 | Kuffel et al. | |
| 2012/0281951 A1 | 11/2012 | Takahashi et al. | |

(Continued)

FOREIGN PATENT DOCUMENTS

| EP | 2 525 245 A1 | 11/2012 |
|---|---|---|
| WO | 2016/053851 A1 | 4/2016 |

OTHER PUBLICATIONS

International Search Report and Written Opinion for Application No. PCT/US2019/037955 dated Dec. 6, 2019.

*Primary Examiner* — Robert Tavlykaev
(74) *Attorney, Agent, or Firm* — Merchant & Gould P.C.

(57) ABSTRACT

The present disclosure relates to a multi-fiber fiber optic connector having features that allows for changeability with respect to gender and polarity. Another aspect relates to a multi-fiber fiber optic connector that can be operated as a true push-pull fiber optic connector.

24 Claims, 25 Drawing Sheets

(56) References Cited

U.S. PATENT DOCUMENTS

| | | | |
|---|---|---|---|
| 2013/0216185 A1* | 8/2013 | Klavuhn | G02B 6/38 |
| | | | 385/60 |
| 2013/0322825 A1* | 12/2013 | Cooke | G02B 6/3831 |
| | | | 385/59 |
| 2016/0259135 A1* | 9/2016 | Gniadek | G02B 6/3885 |
| 2016/0274313 A1* | 9/2016 | Bushnell | G02B 6/3882 |
| 2016/0349464 A1 | 12/2016 | Chang et al. | |
| 2017/0010422 A1* | 1/2017 | Childers | G02B 6/3882 |
| 2017/0102505 A1 | 4/2017 | Nguyen et al. | |
| 2017/0160496 A1 | 6/2017 | de Jong et al. | |
| 2017/0176691 A1 | 6/2017 | Childers et al. | |
| 2017/0176694 A1 | 6/2017 | Childers et al. | |
| 2017/0254961 A1 | 9/2017 | Kamada et al. | |
| 2017/0254966 A1 | 9/2017 | Gniadek et al. | |
| 2017/0285277 A1 | 10/2017 | Chang et al. | |
| 2017/0315308 A1 | 11/2017 | Kamada et al. | |
| 2018/0011254 A1 | 1/2018 | Takano et al. | |
| 2018/0011258 A1 | 1/2018 | Takano et al. | |
| 2018/0239093 A1 | 8/2018 | Chang et al. | |
| 2019/0154924 A1* | 5/2019 | Chang | G02B 6/3831 |
| 2019/0162918 A1 | 5/2019 | Childers et al. | |
| 2020/0264387 A1* | 8/2020 | Kuffel | G02B 6/3831 |
| 2020/0284995 A1* | 9/2020 | Good | G02B 6/3883 |
| 2020/0284998 A1* | 9/2020 | Higley | G02B 6/3898 |

\* cited by examiner

MULTI-FIBER OPTICAL CONNECTOR HAVING ENHANCED FUNCTIONALITY

CROSS-REFERENCE TO RELATED APPLICATIONS

This application claims the benefit of U.S. Provisional Application No. 62/687,163, filed Jun. 19, 2018, and titled "MULTI-FIBER OPTICAL CONNECTOR HAVING ENHANCED FUNCTIONALITY," the disclosure of which is hereby incorporated herein by reference.

TECHNICAL FIELD

The present disclosure relates generally to fiber optic connectors. More particularly, the present disclosure relates to multi-fiber fiber optic connectors.

BACKGROUND

A multi-fiber fiber optic connector, for example an MPO (Multi-Fiber Push On) connector, typically includes a connector body supporting a multi-fiber ferrule at a front end and a connector boot at a rear end. Typically, an outer release-sleeve (i.e., a grip-sleeve) is mounted on the connector body. The outer release-sleeve is slidable relative to the connector body and is spring biased toward a forward position. When the multi-fiber fiber optic connector is inserted into a corresponding fiber optic adapter, the release-sleeve covers latches of the fiber optic adapter to retain the latches in latched positions relative to the connector body such that the fiber optic connector is prevented from being withdrawn from the adapter. By pulling back on the release-sleeve, the release-sleeve is displaced from the latches of the fiber optic adapter such that the latches can flex outwardly to unlatched positions in which multi-fiber fiber optic connector can be withdrawn from the fiber optic adapter.

An MPO connector can either be male or female. A male MPO connector includes two alignment pins that project forwardly from the multi-fiber ferrule of the connector. A female MOP connector includes alignment openings within the multi-fiber ferrule adapted to receive the alignment pins of a mating male MPO connector. The ability to change genders between male and female MPO connectors in the field is desirable.

MPO connectors typically include a key integrated with the connector housing for determining the polarity of the fiber optic connectors. Depending on the fiber optic system into which the MPO connector is intended to be incorporated, it may be required to have a key on either a bottom side or a top side of the fiber optic connector.

SUMMARY

One aspect of the present disclosure relates to a multi-fiber fiber optic connector having a connector body with a front end. The multi-fiber fiber optic connector also includes a multi-fiber ferrule positioned at the front end of the connector body. The fiber optic connector further includes an outer grip-sleeve assembly that mounts on the connector body. The outer grip-sleeve assembly includes a main grip-sleeve body and two separate adapter latch locks mounted at opposite sides of the main grip-sleeve body. The adapter latch locks are slidably movable relative to the main grip-sleeve body and are independently movable relative to one another. Separate springs bias the adapter latch locks toward forward positions relative to the main grip-sleeve body, and also bias the main grip-sleeve body toward a forward position relative to the connector body.

Another aspect of the present disclosure relates to a multi-fiber fiber optic connector including a connector body having a front end. The fiber optic connector also includes a multi-fiber ferrule mounted at the front end of the connector body. The fiber optic connector also includes an outer grip-sleeve that mounts on the connector body. The outer grip-sleeve is mounted to slide longitudinally relative to the connector body and is spring biased toward a forward position relative to the connector body. The fiber optic connector further includes keys slidably mounted at top and bottom sides of the connector body. The keys are each slidably movable relative to the connector body between an extended position and a retracted position. Each of the keys includes first and second latches. The connector body defines latch receptacles that are defined at the top and bottom sides of the connector body and that are covered by the outer grip-sleeve. The outer grip-sleeve includes latch blocking surfaces that cover the latch receptacles to provide key latch retention when the outer grip-sleeve is in the forward position. When the outer grip-sleeve is in a rearward position relative to the connector body, the latch blocking surfaces are offset from the latch receptacles to allow key latch disengagement from the latch key receptacles. When the keys are in the extended positions, the first key latches engage with the key latch receptacles. In contrast, when the keys are in the retracted positions, the second key latches engage with the latch receptacles.

Another aspect of the present disclosure relates to a fiber optic connector including a connector body having a front end. The fiber optic connector also includes a multi-fiber ferrule positioned at the front end of the connector body. The fiber optic connector further includes a grip-sleeve mounted on the connector body. The fiber optic connector includes alignment pins mountable within alignment pin openings defined by the multi-fiber ferrule. The alignment pins include circumferential retention grooves adjacent rear ends of the alignment pins. The fiber optic connector includes an alignment pin retention structure including resilient spring elements. The resilient spring elements include pin retaining portions that are moveable between pin retaining positions and pin release positions, and that are spring biased toward the pin retaining positions. In one example, the pin retaining portions fit within the circumferential grooves at inner sides of the alignment pins, and are moved from the pin retaining positions to the pin release positions by flexing the pin retaining portions inwardly toward a central axis of the fiber optic connector. In another example, the pin retaining portions fit within the circumferential grooves at outer sides of the alignment pins, and are moved from the pin retaining positions to the pin release positions by flexing the pin retaining portions outwardly away from the central axis of the fiber optic connector. In certain examples, a tool can be used to move each resilient spring element from the pin retaining position to the pin release position without requiring the fiber optic connector to be disassembled.

A variety of advantages of the disclosure will be set forth in part in the description that follows, and in part will be apparent from the description, or may be learned by practicing the various aspects of the present disclosure. It is to be understood that both the forgoing general description and the following detailed description are exemplary and explanatory only and are not restrictive of the broad inventive concepts upon which the examples are based.

DETAILED DESCRIPTION

FIGS. 1-7 depict a multi-fiber fiber optic connector 20 in accordance with the principles of the present disclosure. The multi-fiber fiber optic connector 20 has enhanced functionality at least relating to the ability to easily change polarity, the ability to easily change gender, and the ability to operate the multi-fiber fiber optic connector 20 as a true push-pull fiber optic connector (e.g., a true push-pull MPO connector). A true push-pull fiber optic connector is a connector in which the outer grip sleeve can be grasped during both insertion of the connector into a fiber optic adapter and during removal of the connector from the fiber optic adapter.

Figure 7:
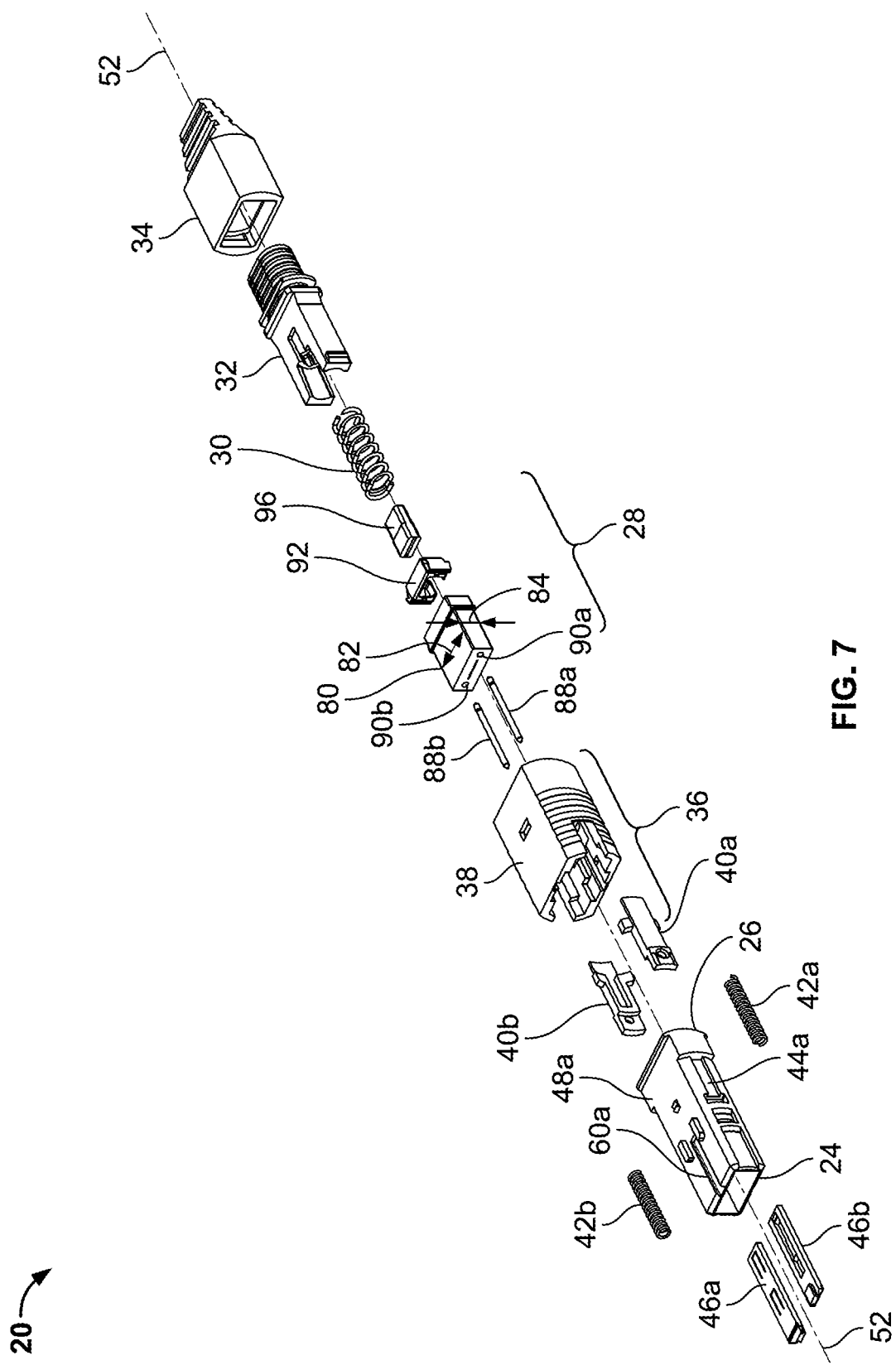
FIG. 7 is an exploded view of the multi-fiber fiber optic connector of FIG. 1.

As best shown at FIG. 7, the multi-fiber fiber optic connector 20 includes a connector body 22 having a front end 24 and an opposite rear end 26. A ferrule assembly 28 of the multi-fiber fiber optic connector 20 is configured to mount within an interior of the connector body 22. A spring 30 of the multi-fiber fiber optic connector 20 is configured to bias the ferrule assembly 28 in a forward direction relative to the connector body 22. The multi-fiber fiber optic connector 20 also includes a rear spring stop 32 configured to mount within the rear end 26 of the connector body 22. The rear spring stop 32 is configured to retain the spring 30 within the connector body 22. A rear connector boot 34 is configured to mount to a rear end of the rear spring stop 32. The rear connector boot 34 can have a flexible configuration for providing optical fiber bend radius protection and strain relief at the rear end of the multi-fiber fiber optic connector 20. It will be appreciated that in use, the connector 20 mounts at the end of a fiber optic cable, and the boot 34 preferably provides flexible support where the cable enters the rear of the connector. The multi-fiber fiber optic connector 20 further includes an outer grip-sleeve assembly 36 configured to mount over the connector body 22. The outer grip-sleeve assembly 36 includes a main grip-sleeve body 38 and separate left and right adapter latch locks 40a, 40b. Left and right grip-sleeve assembly springs 42a, 42b are used to bias the outer grip-sleeve assembly 36 in a forward direction when the outer grip-sleeve assembly 36 is mounted on the connector body 22. The left and right grip-sleeve assembly springs 42a, 42b respectively mount within left and right spring grooves 44a, 44b (see FIG. 8) defined by the connector body 22. The multi-fiber fiber optic connector 20 further includes upper and lower keys 46a, 46b adapted to be slidably mounted respectively at upper and lower major sides 48a, 48b of the connector body 42 adjacent the front end 24 of the connector body 22.

Figure 32:
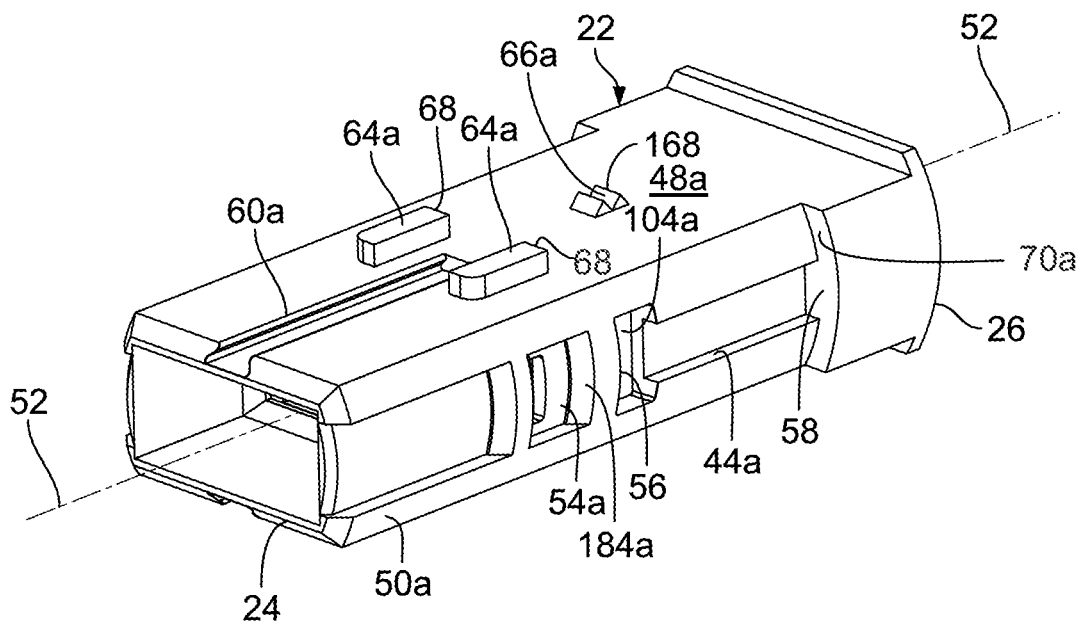
FIG. 32 is a perspective view of one of the connector body of the multi-fiber fiber optic connector of FIG. 1.
Figure 33:
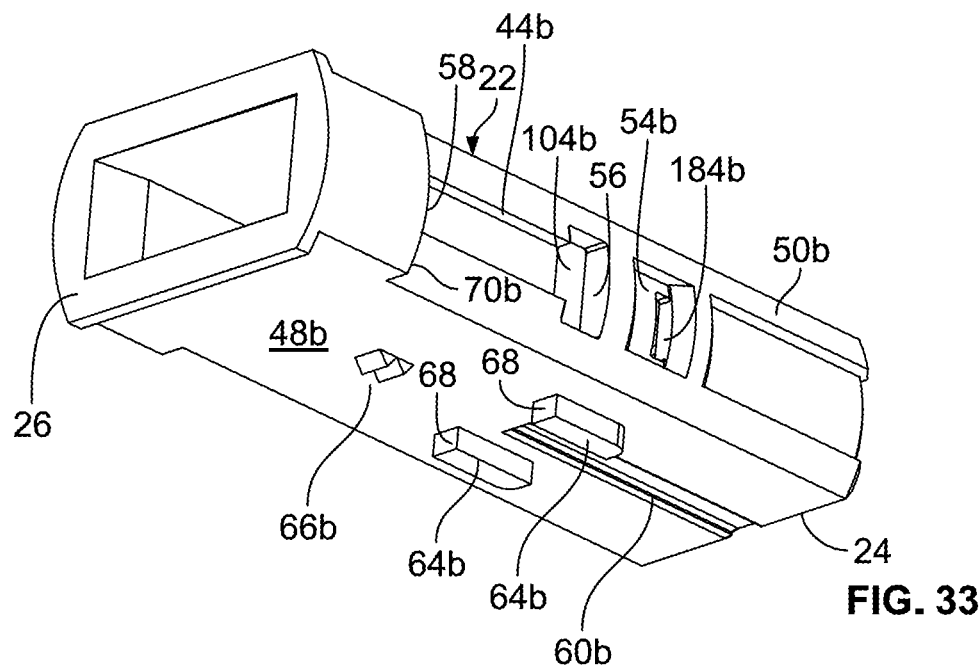
FIG. 33 is another perspective view of the connector body of FIG. 32.

Referring to FIGS. 32 and 33, the upper and lower major sides 48a, 48b of the connector body 22 extend lengthwise between the front end 24 and the rear end 26 of the connector body. The connector body 22 also includes opposite left and right minor sides 50a, 50b that extend between the upper and lower major sides 48a, 48b and also extend lengthwise between the front and rear ends 24, 26. The connector body 22 defines a longitudinal axis 52 that extends between the front and rear ends 24, 26. The left and right minor sides 50a, 50b respectively define left and right adapter latch receptacles 54a, 54b. The left and right minor sides 50a, 50b also define the left and right spring grooves 44a, 44b. The left and right spring grooves 44a, 44b can also be referred to as spring pockets and preferably include open longitudinal sides that respectively face outwardly in left and right directions. The left and right spring grooves 44a, 44b also include front and rear ends 56, 58 that preferably oppose and function as spring stops for opposite ends of the left and right grip-sleeve assembly springs 42a, 42b (see FIG. 8). In certain examples, the front ends 56 of the spring grooves 44a, 44b define rearwardly facing spring stop surfaces and the rear ends 58 of the spring grooves 44a, 44b include forwardly facing spring stop surfaces.

Figure 30:
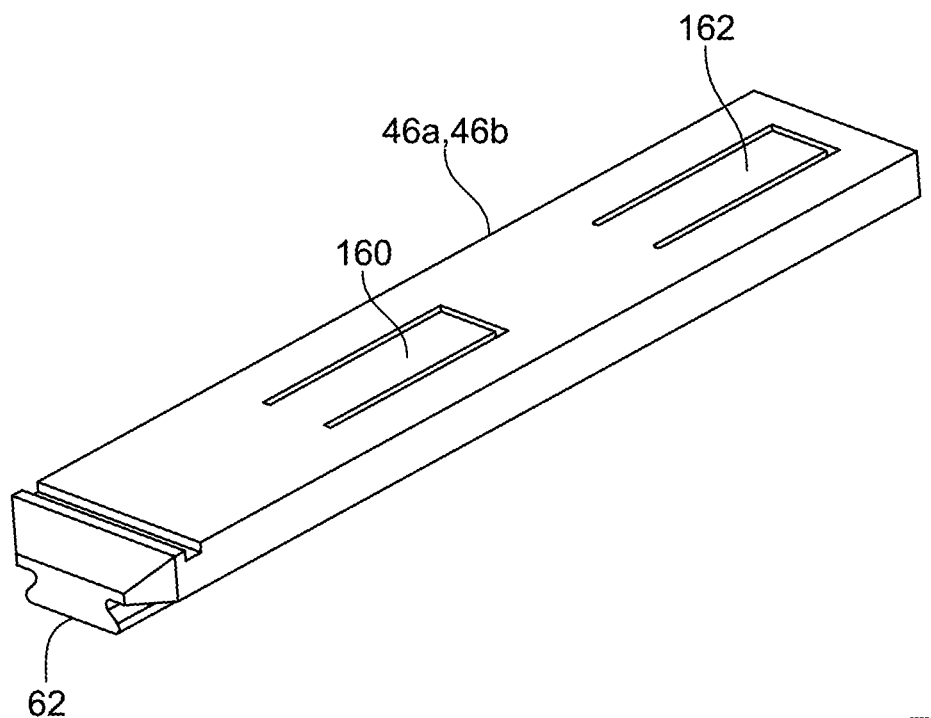
FIG. 30 is a perspective view of one of the keys of the multi-fiber fiber optic connector of FIG. 1.
Figure 31:
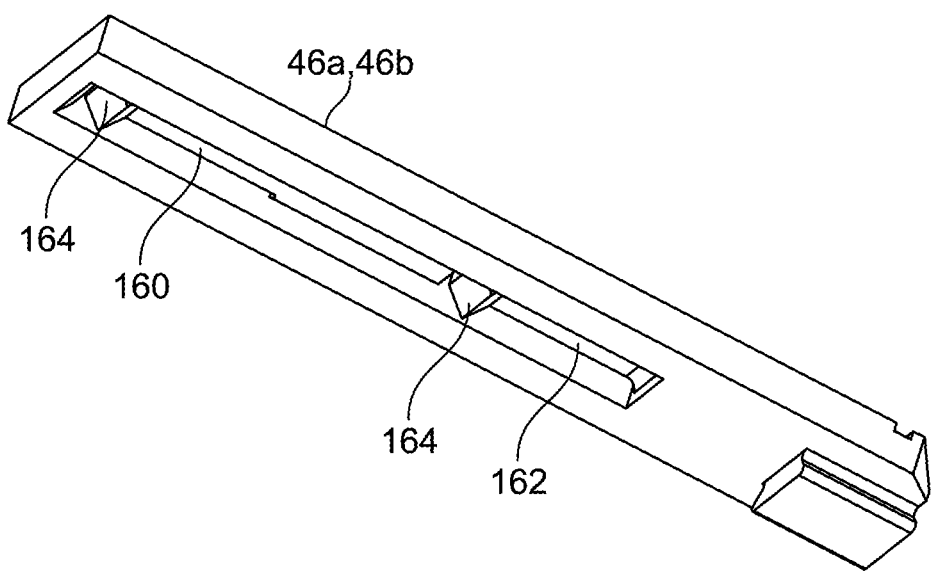
FIG. 31 is another perspective view of the key of FIG. 30.

The connector body 22 also includes structure for accommodating the upper and lower keys 46a, 46b. Preferably, the upper and lower keys 46a, 46b respectively slidably mount to the upper and lower major sides 48a, 48b of the connector body 22. It is preferred for the upper and lower keys 46a, 46b to each be slidably movable along the longitudinal axis 52 relative to the connector body 22 between forward and rearward positions. To accommodate sliding movement of the upper and lower keys 46a, 46b, the connector body 22 defines upper and lower longitudinal key mounting slots 60a, 60b (see FIGS. 14-16, 32 and 33) that extend longitudinally along the connector body 22 in a rearward direction from the front end 24 of the connector body 22. In certain examples, the key mounting slots 60a, 60b can each have a dovetail shaped transverse cross-sectional profile (see FIG. 32) adapted to receive mating projections 62 (see FIG. 30) of the upper and lower keys 46a, 46b. It will be appreciated that the projections 62 can have complimentary cross-sections with the transverse cross-sectional profiles of the key mounting slots 60a, 60b and are preferably also dovetail shaped (see FIGS. 30 and 31). The connector body 22 further includes upper and lower sets of key guides 64a, 64b at the upper and lower major sides 48a, 48b (see FIGS. 14, 32 and 33). The key guides 64a, 64b are configured as guiderails that have lengths that extend along the longitudinal axis 52. The key guides 64a, 64b include opposing surfaces between which the upper and lower keys 46a, 46b slide. The connector body 22 further includes upper and lower key latch receptacles 66a, 66b (see FIGS. 14-16, 32 and 33).

Figure 27:
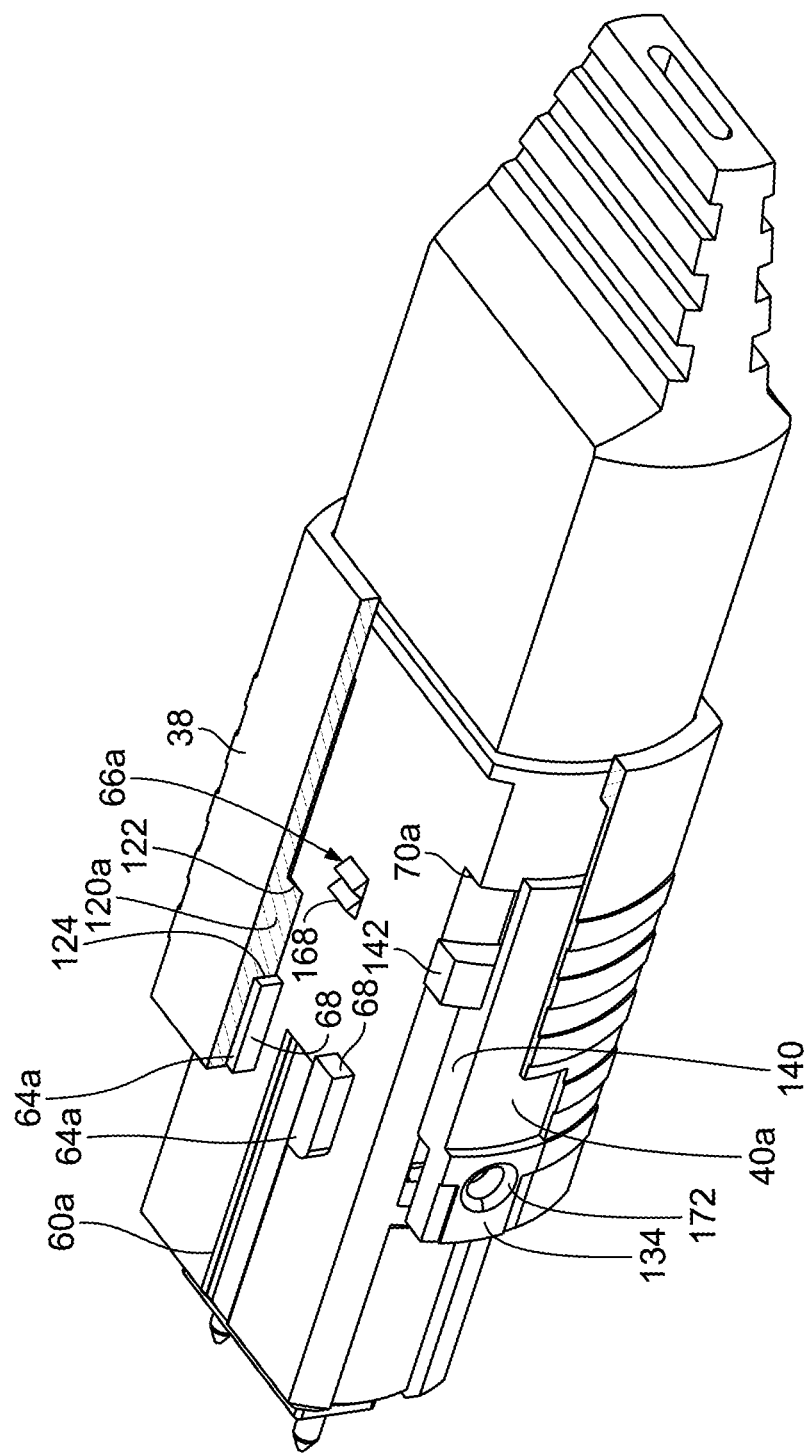
FIG. 27 is a partial cross-sectional view of the multi-fiber fiber optic connector of FIG. 1.

The connector body 22 further includes exterior structures for retaining the outer grip-sleeve assembly 36 on the connector body 22 when the outer grip-sleeve assembly 36 has been installed over the connector body 22. For example, the upper and lower key guides 64a, 64b include rear ends 68 which include rearwardly facing stop surfaces adapted to stop forward movement of the outer grip-sleeve assembly 36 relative to the connector body 22 once the outer grip-sleeve assembly 36 is mounted on the connector body 22 (see FIG. 27). Additionally, the connector body 22 includes left and right side stops 70a, 70b (see FIGS. 27, 32 and 33) near the rear end 26 of the connector body 22. The left and right side stops 70a, 70b include forwardly facing stop surfaces that are adapted to stop movement of the outer grip-sleeve assembly 36 in the rearward direction when the outer grip-sleeve assembly 36 is mounted on the connector body 22.

Referring to FIG. 7, the ferrule assembly 28 of the multi-fiber fiber optic connector 20 includes a multi-fiber ferrule 80 that is positioned within the connector body 22 adjacent the front end 24 of the connector body when the ferrule assembly 28 has been installed within the connector body 22. The multi-fiber ferrule 80 has an elongate transverse cross-sectional profile defining perpendicular major and minor dimensions 82, 84 (see FIGS. 6 and 7). With the multi-fiber ferrule 80 installed in the connector body 22, the major dimension 82 extends between the left and right minor sides 50a, 50b of the connector body 22 and the minor dimension 84 extends between the upper and lower major sides 48a, 48b of the connector body 22 (see FIG. 6). The multi-fiber ferrule 80 defines a plurality of fiber openings 86 (see FIG. 8) for receiving optical fibers corresponding to a fiber optic cable which is terminated by the multi-fiber fiber optic connector 20. At least some of the fiber openings 86 are arranged in a row that extends along the major dimension 82 of the multi-fiber ferrule 80.

Figure 8:
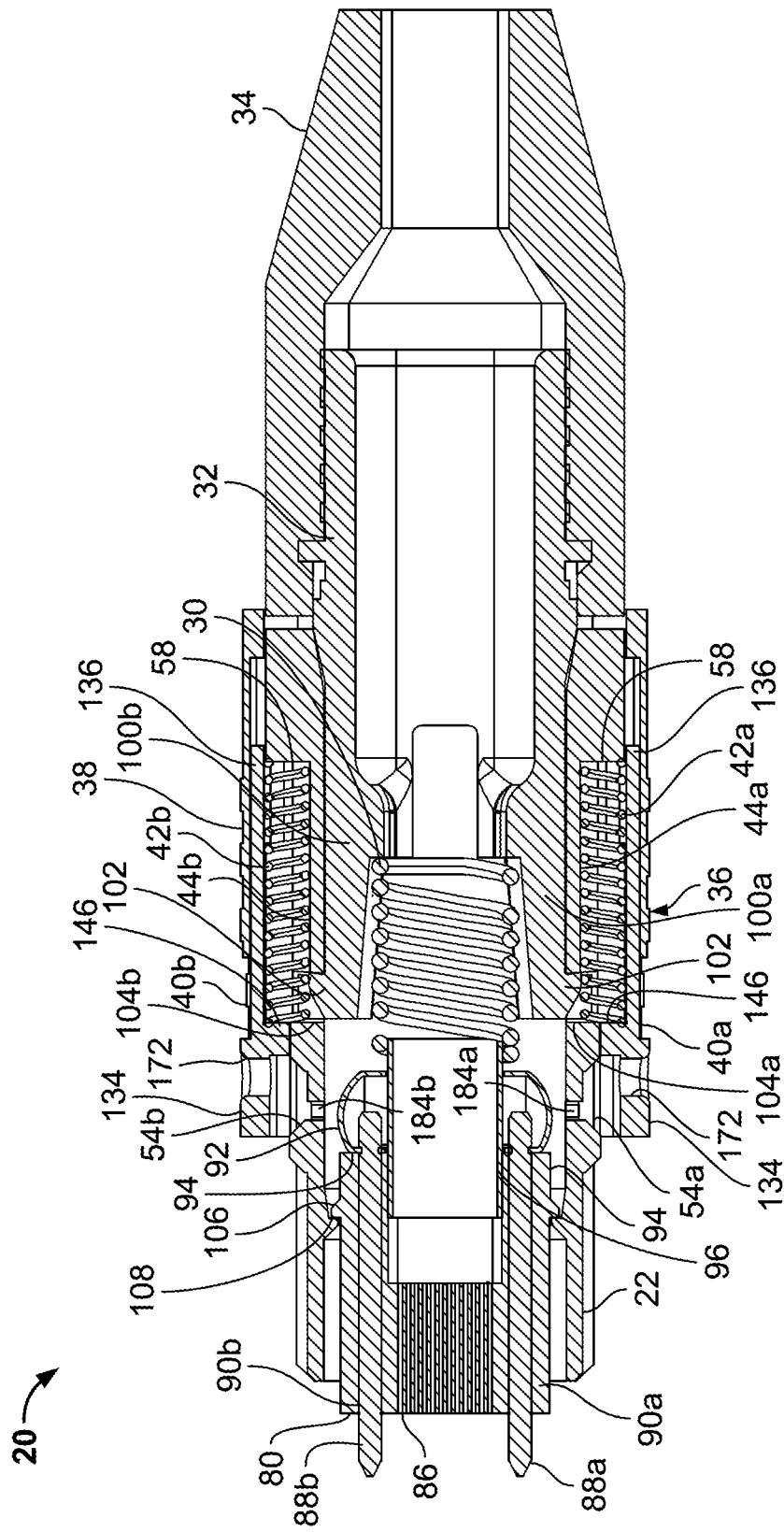
FIG. 8 is a cross-sectional view taken along section line 8-8 of FIG. 6.

The multi-fiber ferrule 80, when installed in the connector body 22, is preferably movable relative to the connector body along the longitudinal axis 52 and is spring biased toward a forward position relative to the connector body 22 by the ferrule biasing spring 30 (see FIG. 8). Referring again to FIG. 7, the ferrule assembly 28 also includes left and right ferrule alignment pins 88a, 88b that mount within corresponding left and right alignment pin openings 90a, 90b when the multi-fiber fiber optic connector 20 is configured as a male connector. When the ferrule alignment pins 88a, 88b are mounted within the alignment pin openings 90a, 90b, the ferrule alignment pins 88a, 88b are retained within the alignment pin openings 90a, 90b by a pin retention structure 92 (i.e., a pin retention arrangement) that mounts at a rear end of multi-fiber ferrule 80. In certain examples, the pin retention structure 92 is held against the back end of the ferrule 80 by the ferrule biasing spring 30. In certain examples, the ferrule alignment pins 88a, 88b include circumferential grooves 94 (see FIG. 20) adjacent rear ends of the ferrule alignment pins 88a, 88b which are engaged by the pin retention structure 92 to retain the ferrule alignment pins 88a, 88b within the alignment pin openings 90a, 90b. When the multi-fiber fiber optic connector 20 is configured as a female fiber optic connector, the ferrule alignment pins 88a, 88b are not present within the alignment pin openings 90a, 90b such that when the female fiber optic connector is mated with a corresponding male fiber optic connector, the ferrule alignment pins of the male fiber optic connector can be received within the alignment pin openings 90a, 90b to provide alignment between the multi-fiber ferrules of the mated fiber optic connectors. The ferrule assembly 28 additionally includes a ferrule boot 96 that is assembled within the rear end of the multi-fiber ferrule 80. The ferrule boot 96 is configured for receiving the optical fibers that are routed into the multi-fiber ferrule 80 from the cable to which the multi-fiber connector 20 is terminated. For example, the ferrule boot 96 can define a through passage for receiving optical fibers routed into the multi-fiber ferrule 80 from the optical cable to which the multi-fiber fiber optic connector 20 is terminated/mounted.

It will be appreciated that the ferrule assembly 28, the ferrule biasing spring 30 and the rear spring stop 32 are all loaded into the connector body 22 through the rear end 26 of the connector body 22. The ferrule biasing spring 30 has a front end that seats against the pin retention structure 92 and a rear end that abuts against a spring seat 98 of the rear spring stop 32. As shown at FIG. 8, the rear spring stop 32 includes left and right latching arms 100a, 100b which include retention tabs 102 that snap within corresponding left and right openings 104a, 104b defined by the left and right minor sides 50a, 50b of the connector body 22 when the rear spring stop 32 is loaded into the connector body 22. The left and right openings 104a, 104b coincide with (e.g., intersect with) front portions of the spring grooves 44a, 44b. When the multi-fiber ferrule 80 is biased to the forward position by the ferrule biasing spring 30, a front shoulder 106 of the multi-fiber ferrule 80 abuts against a stop structure 108 within the connector body 22. The ferrule assembly 28 and the ferrule biasing spring 30 are thus captured within the connector body 22 between the stop structure 108 and the rear spring stop 32.

Figure 1:
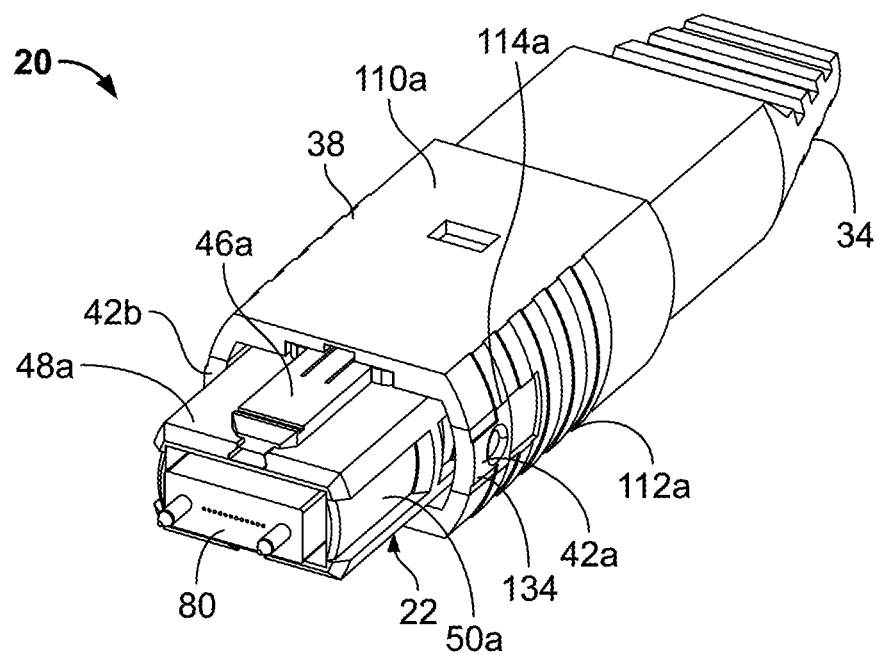
FIG. 1 is a front, top, left perspective view of a multi-fiber fiber optic connector in accordance with the principles of the present disclosure.
Figure 2:
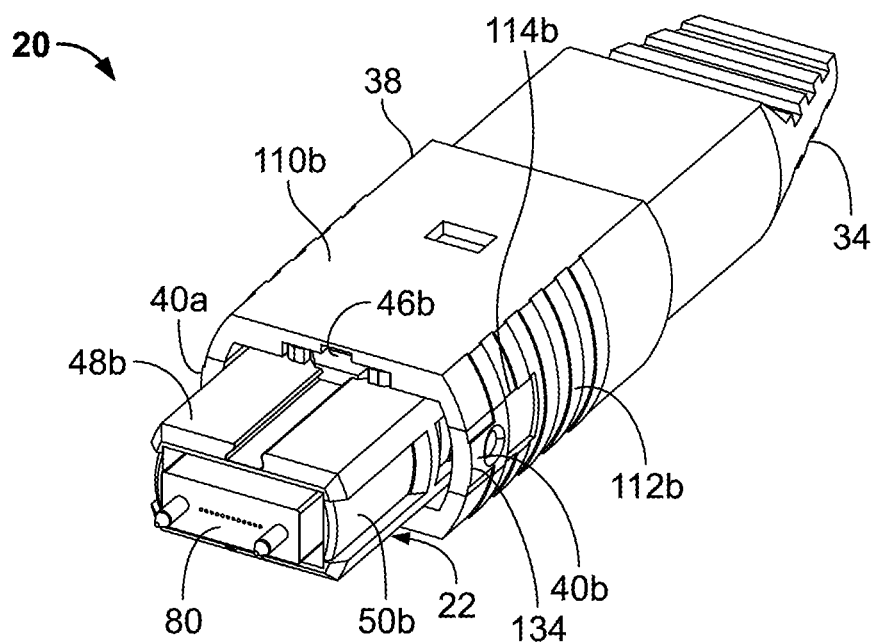
FIG. 2 is a front, bottom, right perspective view of the multi-fiber fiber optic connector of FIG. 1.
Figure 3:
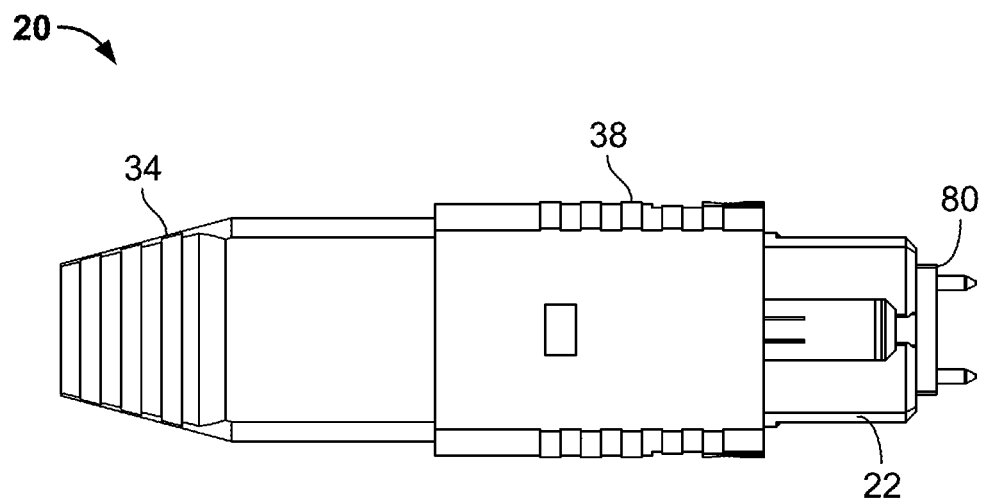
FIG. 3 is a top view of the multi-fiber fiber optic connector of FIG. 1.
Figure 4:
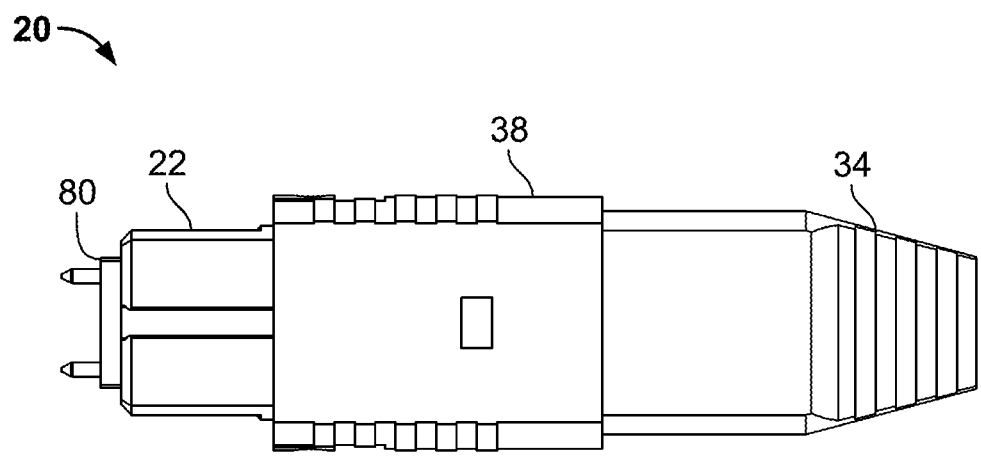
FIG. 4 is a bottom view of the multi-fiber fiber optic connector of FIG. 1.
Figure 5:
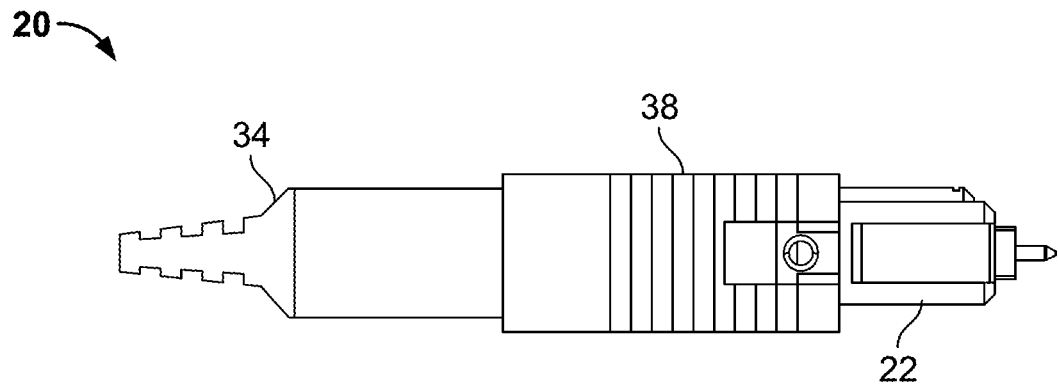
FIG. 5 is a right side view of the multi-fiber fiber optic connector of FIG. 1.
Figure 6:
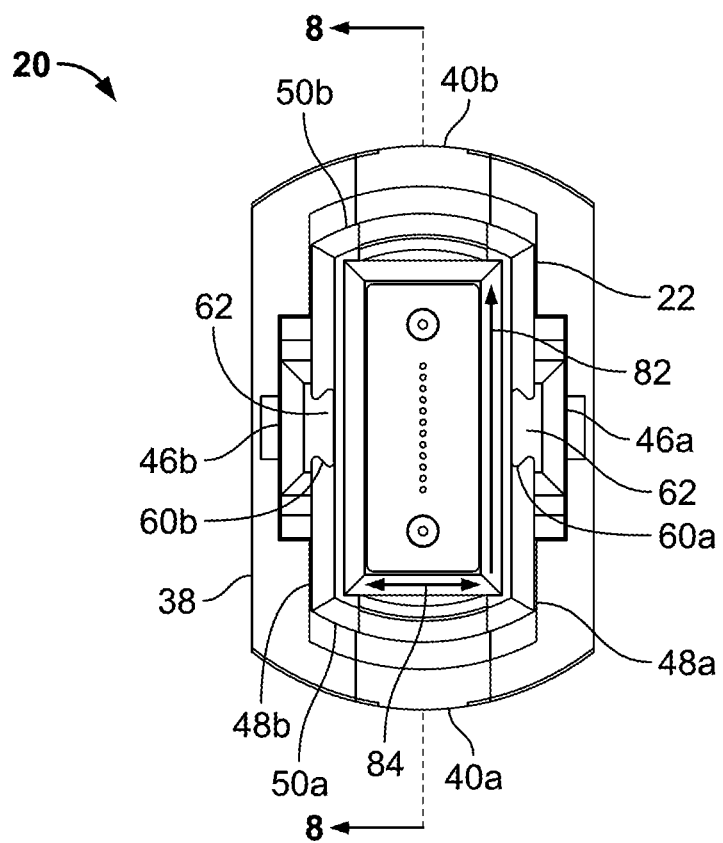
FIG. 6 is a front view of the multi-fiber fiber optic connector of FIG. 1.
Figure 34:
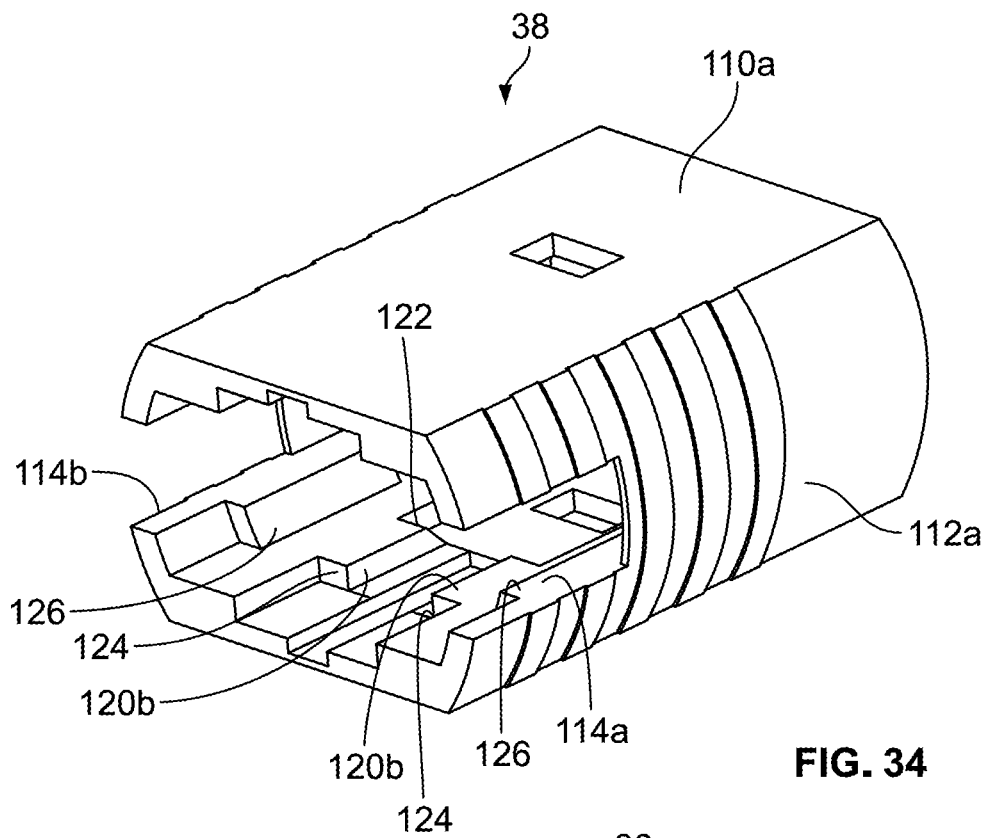
FIG. 34 is a perspective view of the main grip-sleeve body multi-fiber fiber optic connector of FIG. 1.
Figure 35:
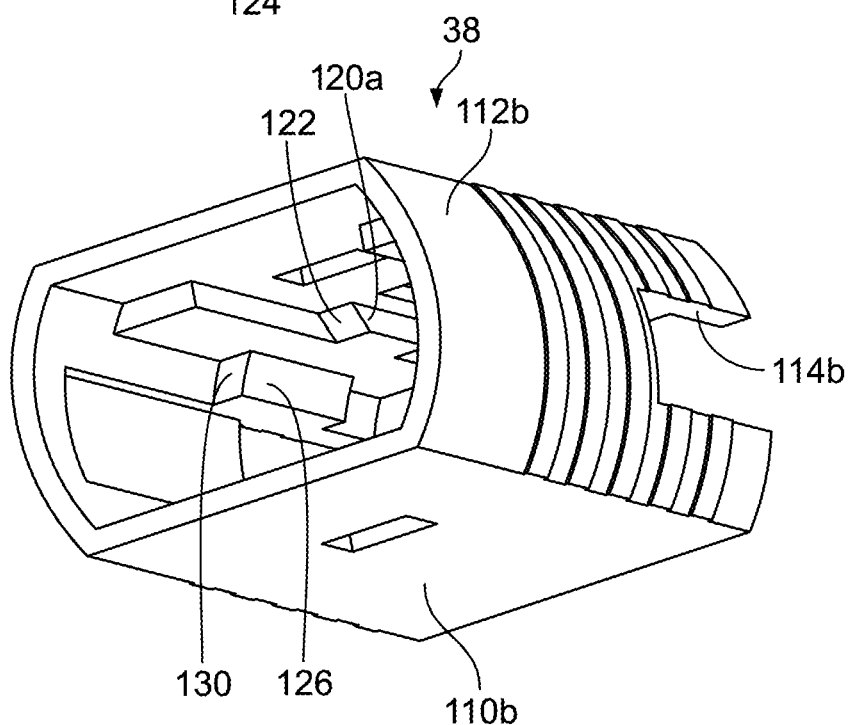
FIG. 35 is another perspective view of the main grip-sleeve body of FIG. 34.

The main grip-sleeve body 38 of the outer grip-sleeve assembly 36 includes upper and lower major sides 110a, 110b (see FIGS. 34 and 35) that respectively oppose the upper and lower major sides 48a, 48b of the connector body 22 when the main grip-sleeve body 38 is mounted on the connector body 22 (see FIGS. 1 and 2). The main grip-sleeve body 38 also includes left and right minor sides 112a, 112b (see FIGS. 34 and 35) that respectively oppose the left and right minor sides 50a, 50b of the connector body 22 when the main grip-sleeve body 38 is mounted on the connector body 22 (see FIGS. 1 and 2). When mounted on the connector body 22, the main grip-sleeve body 38 is movable relative to the connector body 22 along the longitudinal axis 52 of the connector body 22 between a forward position (see FIG. 15) and a rearward position (see FIG. 16). The left and right minor sides 112a, 112b of the main grip-sleeve body 38 define left and right front notches 114a, 114b having open front ends 116 (see FIG. 34).

Figure 9:
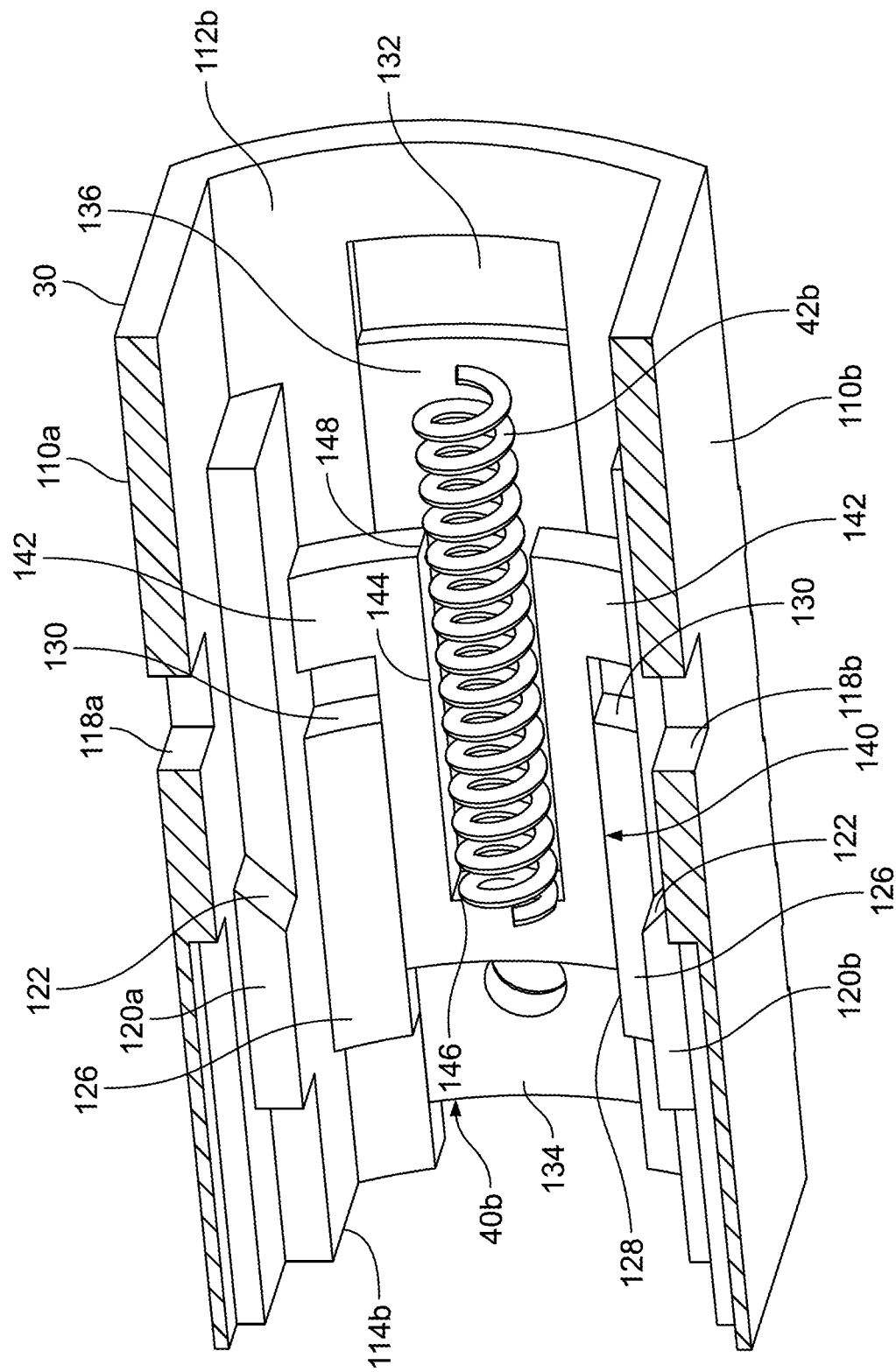
FIG. 9 is a cross-sectional view cut along a vertical plane through an outer grip-sleeve assembly of the multi-fiber fiber optic connector of FIG. 1.
Figure 15:
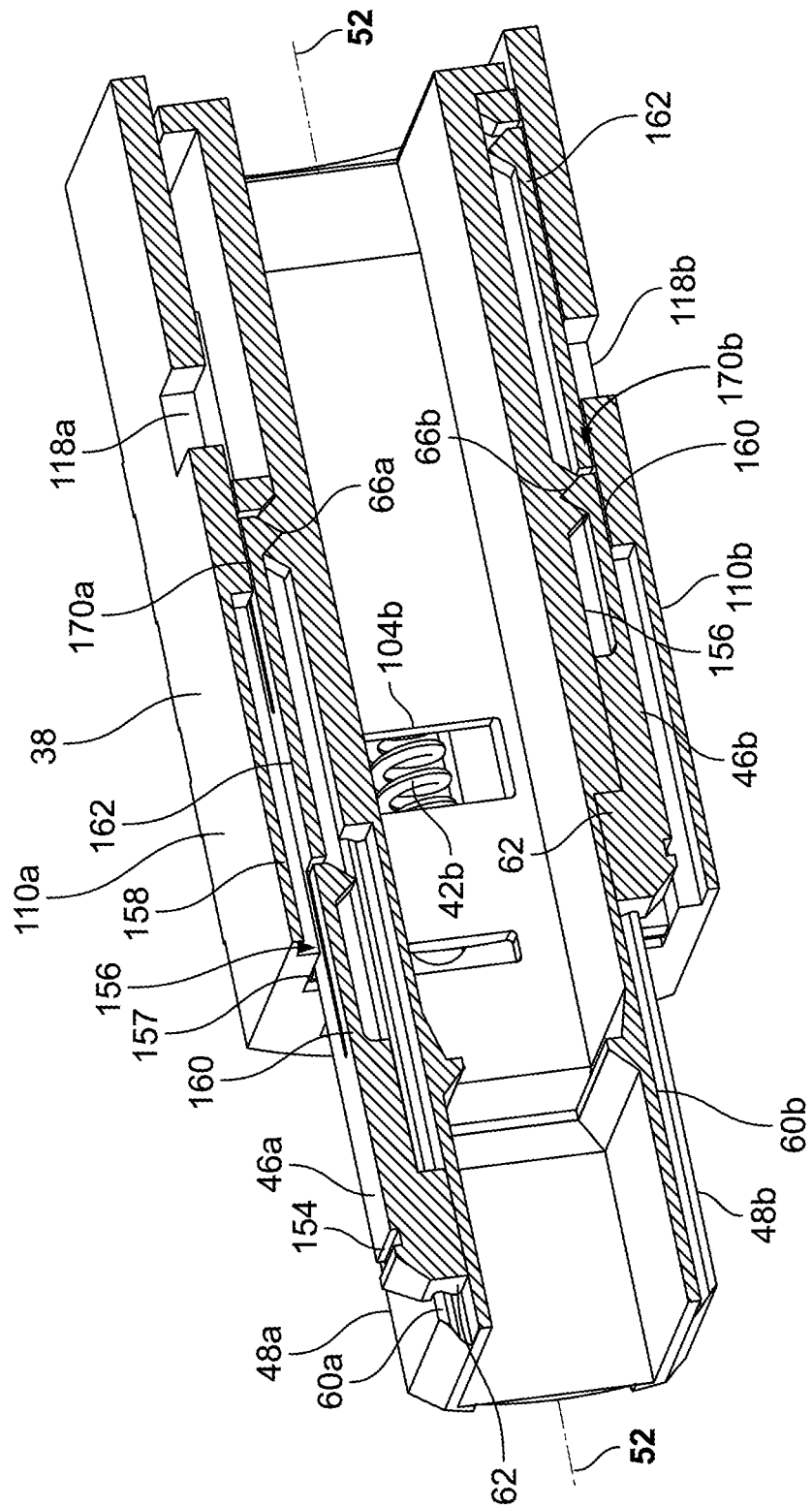
FIG. 15 is a cross-sectional view showing the upper and lower keys of the multi-fiber fiber optic connector of FIG. 1 latched relative to the connector body with the grip-sleeve in a forward position relative to the connector body.
Figure 16:
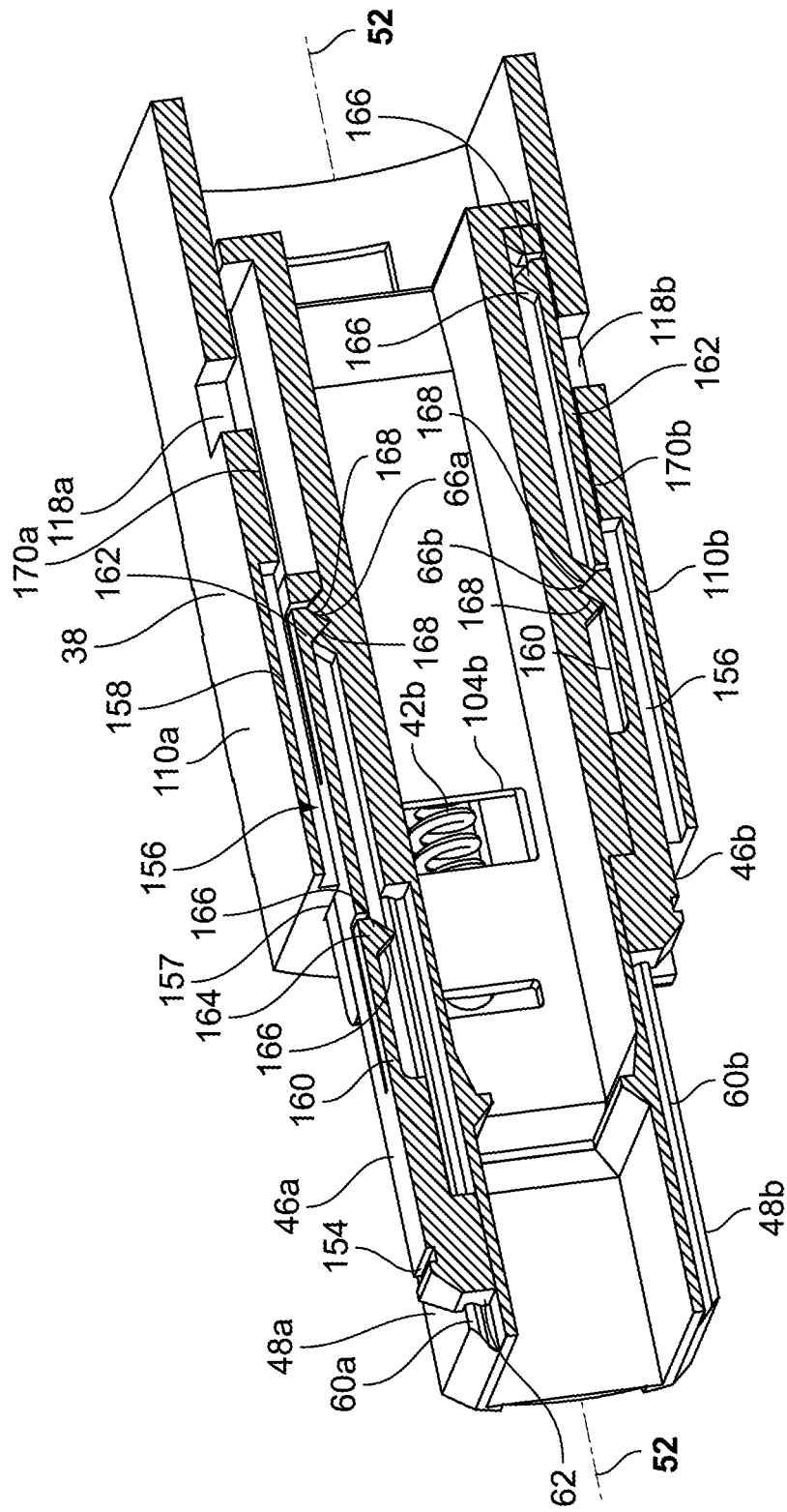
FIG. 16 shows the assembly of FIG. 15 with the grip-sleeve in a rearward position relative to the connector body.
Figure 17:
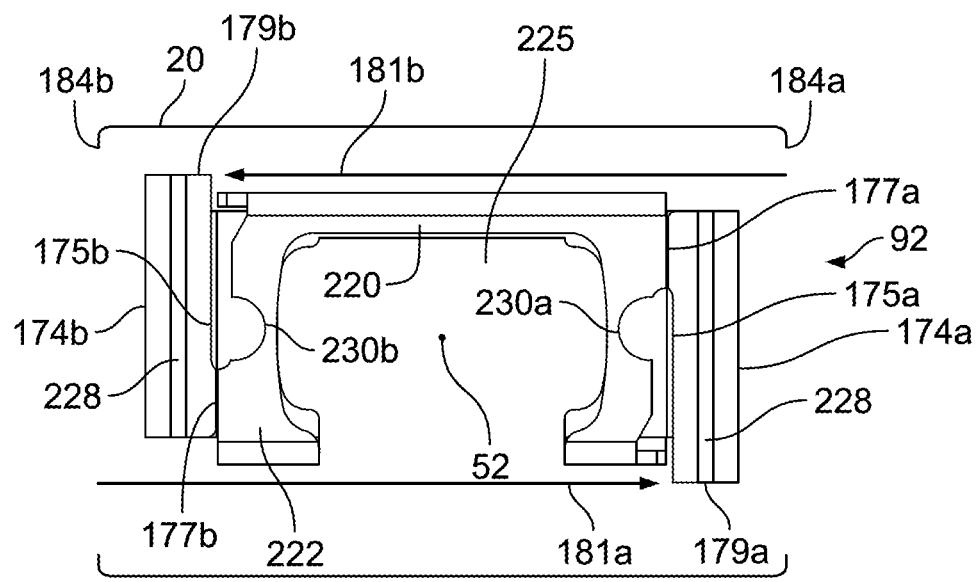
FIG. 17 is a front view of a pin retainer for retaining alignment pins of the multi-fiber fiber optic connector of FIG. 1.
Figure 18:
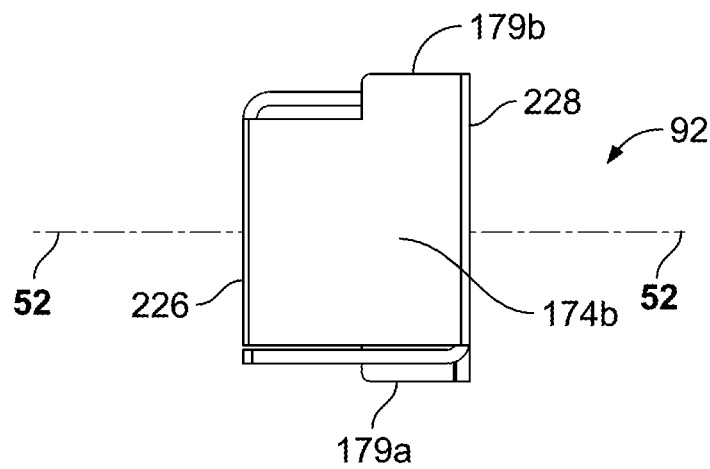
FIG. 18 is a right side view of the pin retainer of FIG. 17.
Figure 19:
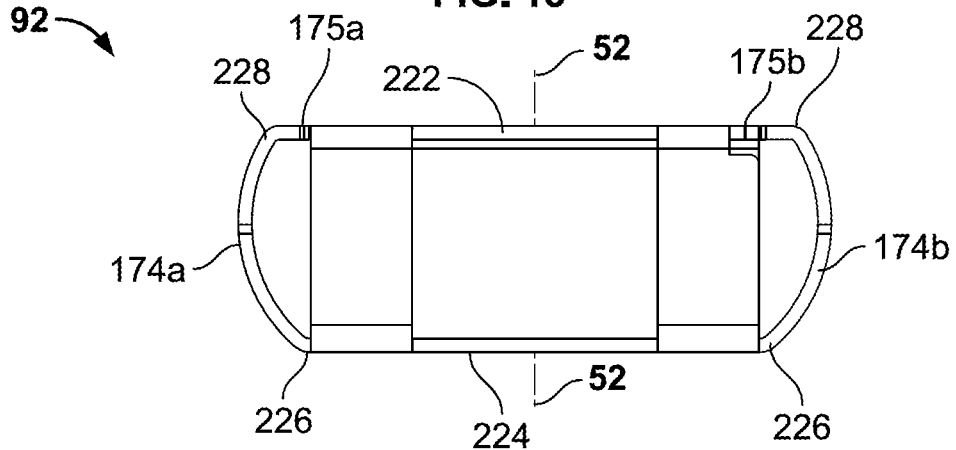
FIG. 19 is a top view of the pin retainer of FIG. 17.

Referring to FIGS. 9, 15 and 16, the main grip-sleeve body 38 defines upper and lower viewing windows 118a, 118b defined respectively through the upper and lower major sides 110a, 110b of the main grip-sleeve body 38. The windows 118a, 118b allow a person to quickly visually determine a position (e.g., an extended/active keying position or a retracted/inactive keying position) of plurality of the keys 46a, 46b even when the multi-fiber fiber optic connector 20 is secured within a fiber optic adapter.

Figure 10:
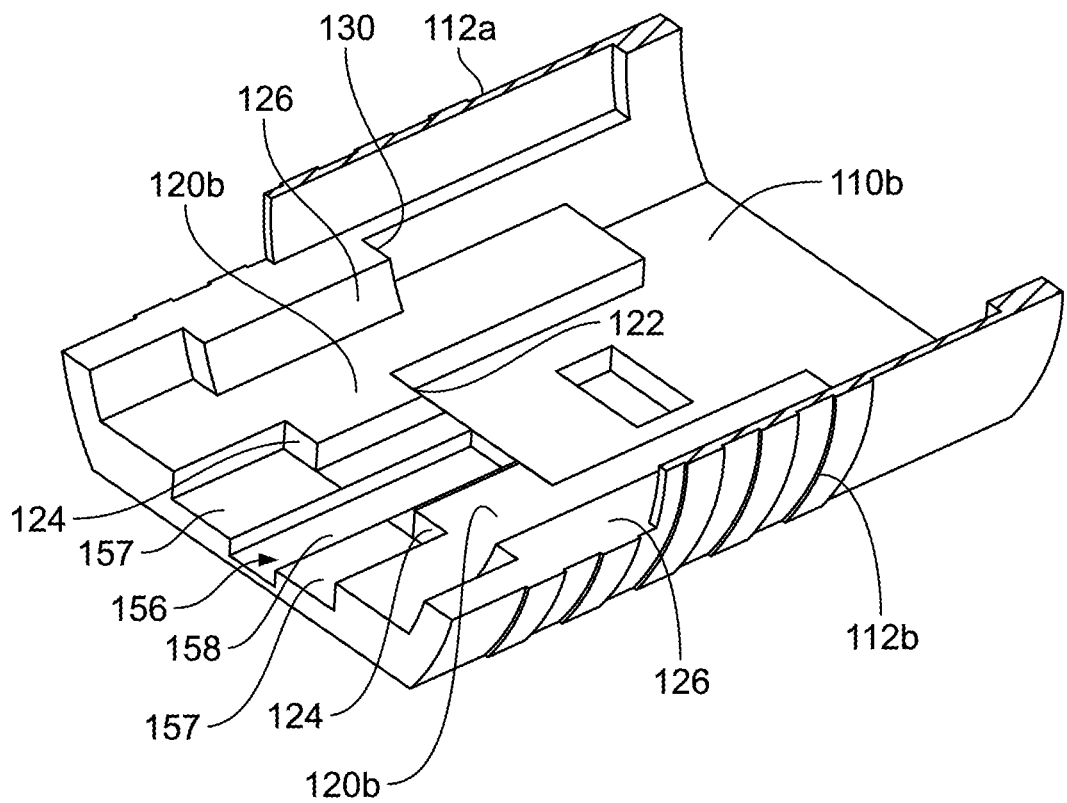
FIG. 10 is a cross-sectional view cut along a horizontal plane that bisects a main grip-sleeve body of the outer grip-sleeve assembly of the multi-fiber fiber optic connector of FIG. 1.

The main grip-sleeve body 38 includes structure for guiding sliding movement of the upper and lower keys 46a, 46b and also includes structure for retaining the main grip-sleeve body 38 on the connector body 22. For example, the main grip-sleeve body 38 includes upper and lower sets of rails 120a, 120b (see FIGS. 9, 10 and 27) that coaxially align with the upper and lower sets of key guides 64a, 64b of the connector body 22 when the main grip-sleeve body 38 is mounted on the connector body 22. The rails 120a, 120b include rear ends 122 (see FIGS. 9, 10 and 27) that are formed as angled ramps and front ends 124 (see FIGS. 9, 10 and 27) that form front stops. The main grip-sleeve body 38 is installed on the connector body 22 by inserting the main grip-sleeve body 38 over the front end 24 of the connector body 22. When the main grip-sleeve body 38 is inserted over the front end 24 of the connector body 22, the ramped rear ends 122 of the sets of rails 120a, 120b engage the upper and lower key guides 64a, 64b causing the upper and lower major sides 110a, 110b of the main grip-sleeve body 38 to flex apart thereby allowing the rails 120a, 120b to respectively ride over the upper and lower sets of key guides 64a, 64b. Once the sets of rails 120a, 120b have moved past the upper and lower key guides 64a, 64b, the upper and lower major sides 110a, 110b of the main grip-sleeve body 38 resiliently move back to their normal position and the front ends 124 of the rails 120a, 120b respectively oppose the rear ends of the upper and lower key guides 64a, 64b (see FIG. 27). In this way, the rearward ends of the upper and lower key guides 64a, 64b function as a forward stop for stopping forward movement of the main grip-sleeve body 38 relative to the connector body 22. Opposing inner surfaces of the sets of rails 120a, 120b also function to guide sliding movement of the keys 46a, 46b, since the keys 46a, 46b are mounted therein between the rails of each set of rails 120a, 120b.

The interior of the main grip-sleeve body 38 also includes structure for guiding and stopping movement of the left and right adapter latch locks 40a, 40b relative to the main grip-sleeve body 38. For example, the main grip-sleeve body 38 defines internal side rails 126 (see FIGS. 9, 10, 34 and 35) that project inwardly from the left and right minor sides 112a, 112b. The side rails 126 define guide channels 128 (see FIG. 9) at each of the left and right minor sides 112a, 112b. The side rails 126 also include rear ends 130 (see FIG. 9) that function as stops for stopping forward movement of the left and right adapter latch locks 40a, 40b relative to the main grip-sleeve body 38. The left and right minor sides 112a, 112b of the main grip-sleeve body 38 further include internal guide recesses 132 (see FIG. 9) that also assist in guiding longitudinal sliding of the left and right adapter latch locks 40a, 40b relative to the main grip-sleeve body 38.

Figure 28:
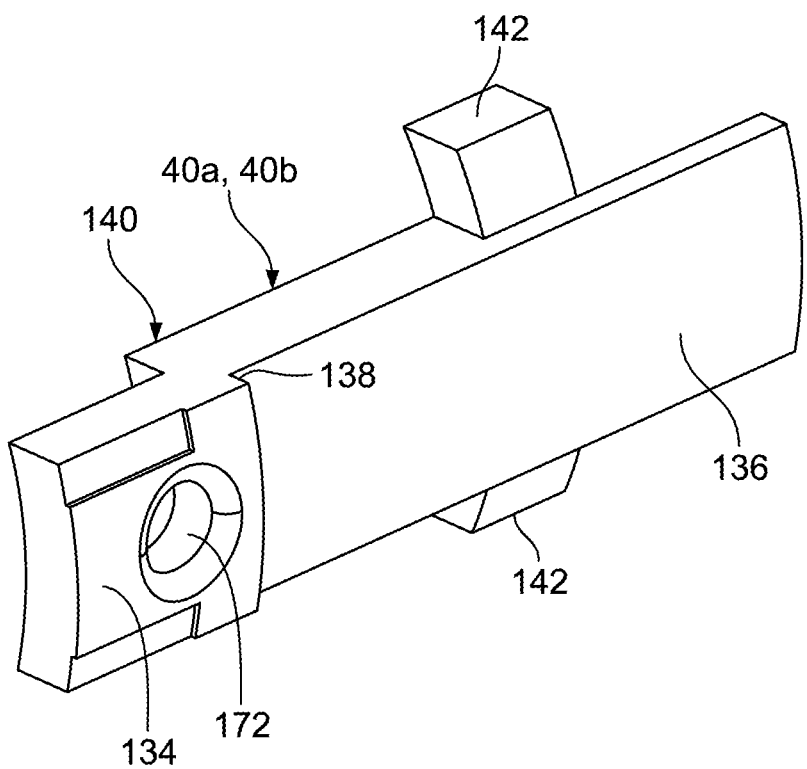
FIG. 28 is a perspective view of one of the adapter latch locks of the multi-fiber fiber optic connector of FIG. 1.
Figure 29:
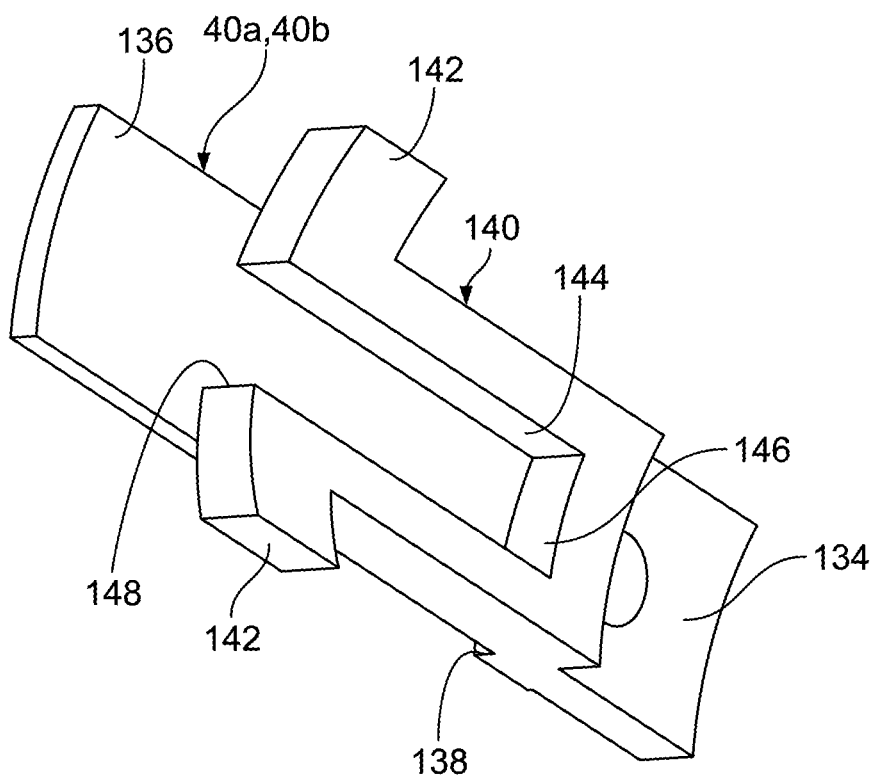
FIG. 29 is another perspective view of the adapter latch lock of FIG. 28.

The left and right adapter latch locks 40a, 40b respectively mount at the left and right minor sides 112a, 112b of the main grip-sleeve body 38. When mounted within the main grip-sleeve body 38, the left and right adapter latch locks 40a, 40b are movable along the longitudinal axis 52 relative to the main grip-sleeve body 38 between forward positions and rearward positions. Preferably, the left and right adapter latch locks 40a, 40b are separate pieces that are moveable relative to each other along the longitudinal axis 52 of the connector body 22 and are also movable relative to the main grip-sleeve body 38 along the longitudinal axis 52. The left and right adapter latch locks 40a, 40b each can include a cover portion 134 (see FIGS. 28 and 29). The cover portions 134 are positioned within the left and right front notches 114a, 114b of the main grip-sleeve body 38 when the left and right adapter latch locks 40a, 40b are positioned within the main grip-sleeve body 38 (see FIGS. 1, 2 and 8).

The adapter latch locks 40a, 40b also include elongate rear guide portions 136 (see FIGS. 28 and 29) that extend rearwardly from the cover portions 134. The rear guide portions 136 are adapted to fit and slide within the guide recesses 132 defined at the interior sides of the left and right minor sides 112a, 112b of the main grip-sleeve body 38 (see FIG. 9). The cover portions 134 are slightly outwardly offset from the rear guide portions 136 such that outer steps 138 (see FIG. 28) are defined at junctions between the rear guide portions 136 and the cover portions 134.

The adapter latch locks 40a, 40b further include top-hat shaped structures 140 (see FIG. 29) that are inwardly offset from the cover portion 134 and the rear guide portion 136. Each top-hat shaped portion 140 defines upper and lower tabs 142 (see FIG. 29) that are configured to oppose the rear ends 130 of the side rails 126 of the main grip-sleeve body 38 when the adapter latch locks 40a, 40b are mounted within the main grip-sleeve body 38 (see FIG. 9). In this way, the rear ends 130 can function as positive stops for limiting forward movement of the adapter latch locks 40a, 40b relative to the main grip-sleeve body 38. When the adapter latch locks 40*a*, 40*b* are mounted within the main grip-sleeve body 38, the top-hat shaped portions 140 can fit between the side rails 126 so that the side rails 126 can guide longitudinal movement of the adapter latch locks 40*a*, 40*b* (see FIG. 9). The top-hat shaped portions 140 define central channels 144 (see FIGS. 9 and 29) having closed forward ends 146 and open rear ends 148. The closed forward ends 146 form forward spring stops and can be referred to as inwardly projecting spring stop shoulders or spring stops. The left and right grip-sleeve assembly springs 42*a*, 42*b* fit within the central channels 144 and forward ends of the left and right grip-sleeve assembly springs 42*a*, 42*b* oppose and are stopped by the closed forward ends 146 of the central channels 144 (see FIGS. 8 and 9). Contact between the grip-sleeve assembly springs 42*a*, 42*b* and the closed forward ends 146 of the central channels 144 allows the springs 42*a*, 42*b* to bias the adapter latch locks 40*a*, 40*b* in a forward direction relative to the main grip-sleeve body 38 toward front stops formed by the rear ends 130 of side rails 126.

To assemble the outer grip-sleeve assembly 36 on a connector body 22, the left and right grip-sleeve assembly springs 42*a*, 42*b* are loaded into the left and right spring grooves 44*a*, 44*b*. Also, the left and right adapter latch locks 40*a*, 40*b* are loaded into the main grip-sleeve body 38. The main grip-sleeve body 38 with the adapter latch locks 40*a*, 40*b* loaded therein is then inserted over the front end 24 of the connector body 22 and snapped into place on the connector body 22. As the main grip-sleeve body 38 with the adapter latch locks 40*a*, 40*b* installed therein is inserted rearwardly onto the connector body 22, lateral outward portions of the left and right grip-sleeve assembly springs 42*a*, 42*b* fit within the central channels 144 of the top-hat shaped structures 140 of the left and right adapter latch locks 40*a*, 40*b* (see FIG. 8). Also, the upper and lower sets of rails 120*a*, 120*b* snap past the upper and lower key guides 64*a*, 64*b* of the main body 22 such that interference between the upper and lower sets of rails 120*a*, 120*b* and the upper and lower key guides 64*a*, 64*b* prevents the outer grip-sleeve assembly 36 from being forwardly removed from the connector body 22 (see FIG. 27). Additionally, interference between the tabs 142 of the left and right adapter latch locks 40*a*, 40*b* and the left and right side stops 70*a*, 70*b* of the connector body 22 prevent the outer grip-sleeve assembly 36 from being rearwardly removed from the connector body 22 (see FIG. 27).

Figure 11:
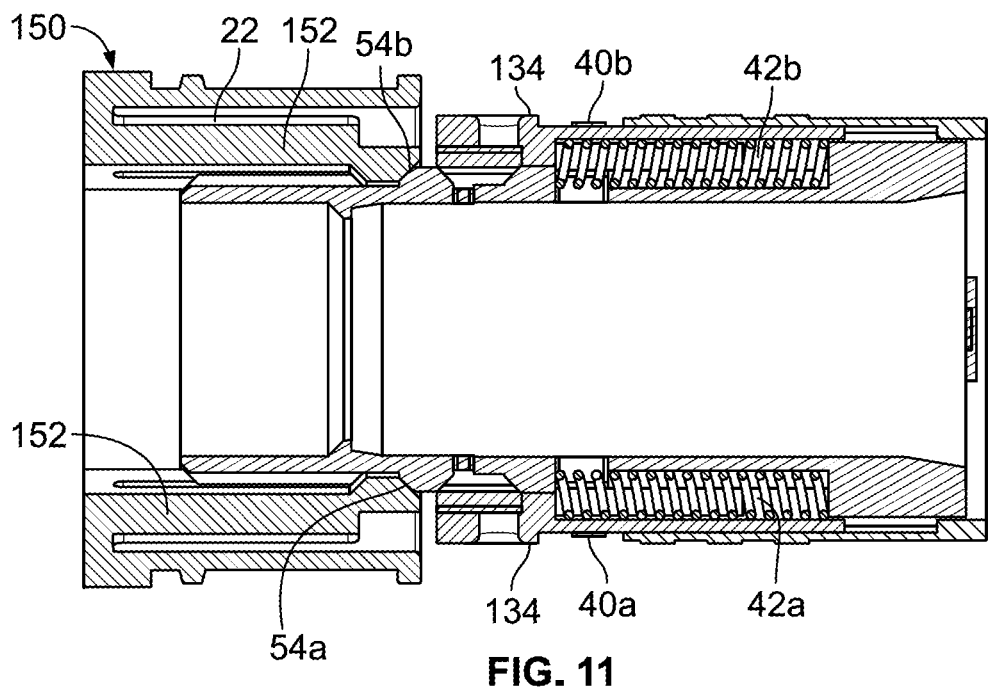
FIGS. 11-13 depict a progression of views showing the multi-fiber fiber optic connector of FIG. 1 being inserted into an adapter.
Figure 12:
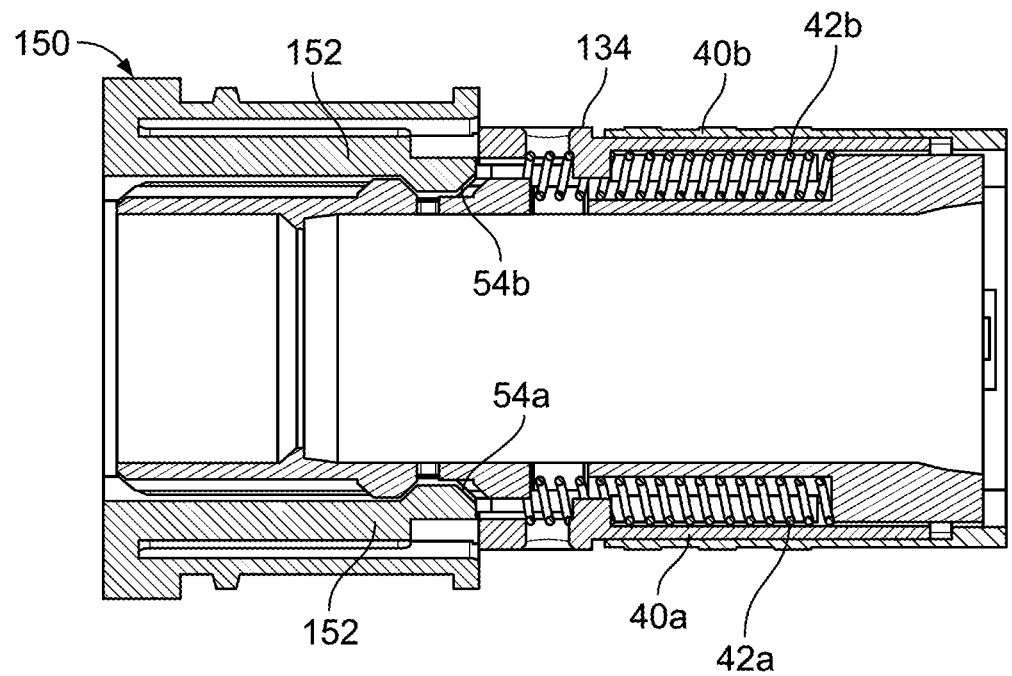
Figure 13:
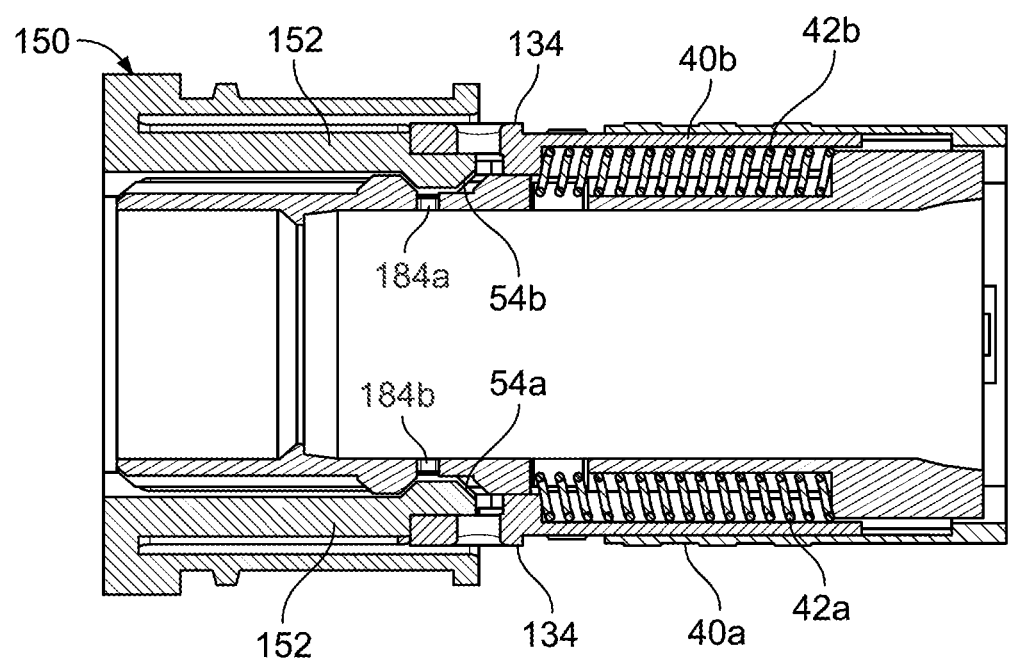

With the outer grip-sleeve assembly 36 mounted on the connector body 22, the left and right grip-sleeve assembly springs 42*a*, 42*b* function to bias the left and right adapter latch locks 40*a*, 40*b* to forward positions relative to the main grip-sleeve body 38 (see FIGS. 8, 11 and 13). However, the springs 42*a*, 42*b* allow for the left and right adapter latch locks 40*a*, 40*b* to move rearwardly to a rearward position (see FIG. 12) relative to the main grip-sleeve body 38. The left and right grip-sleeve assembly springs 42*a*, 42*b* are compressed as the left and right adapter latch locks 40*a*, 40*b* are moved rearwardly relative to the main grip-sleeve body 38. The left and right grip-sleeve assembly springs 42*a*, 42*b* also function to bias the main grip-sleeve body 38 to its forward position relative to the connector body 22 (see FIGS. 15 and 27) in which the front ends 124 of the rails 120*a*, 120*b* respectively oppose the rear ends of the upper and lower key guides 64*a*, 64*b*. Specifically, the left and right grip-sleeve assembly springs 42*a*, 42*b* bias the left and right adapter latch locks 40*a*, 40*b* in a forward direction, and contact between the tabs 142 of the adapter latch locks 40*a*, 40*b* and the rear ends 130 of the side rails 126 of the main grip-sleeve body 38 (see FIG. 9) causes the main grip-sleeve body to also be biased to its forward position by the left and right grip-sleeve assembly springs 42*a*, 42*b*.

It will be appreciated that the forward spring force from the left and right grip-sleeve assembly springs 42*a*, 42*b* is effectively transferred through the adapter latch locks 40*a*, 40*b* to the main grip-sleeve body 38. Thus, the left and right grip-sleeve assembly springs 42*a*, 42*b* respectively bias the left and right adapter latch locks toward their forward positions relative to the main grip-sleeve body 38 (see FIGS. 9, 11 and 13), and the left and right grip-sleeve assembly springs 42*a*, 42*b* also bias the main grip-sleeve body 38 toward its forward position (see FIGS. 15 and 27) relative to the connector body 22. When the main grip-sleeve body 38 is retracted from its forward position (see FIG. 15) to its rearward position (see FIG. 16) against the bias of the grip-sleeve assembly springs 42*a*, 42*b*, it carries the left and right adapter latch locks 40*a*, 40*b* rearwardly with it. This feature allows the main grip-sleeve body 38 to be used to pull back the adapter latch locks 40*a*, 40*b* relative to the connector body 22 to release the fiber optic connector 20 from a corresponding fiber optic adapter. Additionally, when the left and right adapter latch locks 40*a*, 40*b* are forced rearwardly against the bias of the left and right grip-sleeve assembly springs 42*a*, 42*b*, the adapter latch locks 40*a*, 40*b* move rearwardly relative to the main grip-sleeve body 38 while the main grip-sleeve body 38 remains in its forward position. This feature allows the main grip-sleeve body 38 to be held as the fiber optic connector 20 is inserted into a corresponding fiber optic adapter.

When the outer grip-sleeve assembly 36 is mounted on the connector body 22, the cover portions 134 of the left and right adapter latch locks 40*a*, 40*b* are adapted to cover the left and right adapter latch receptacles 54*a*, 54*b* of the connector body 22 (see FIG. 8) when the main grip-sleeve body 38 is in the forward position relative to the connector body 22 and the left and right adapter latch locks 40*a*, 40*b* are in their forward positions relative to the main grip-sleeve body 38. In contrast, the cover portions 134 of the left and right adapter latch locks 40*a*, 40*b* are rearwardly displaced from the left and right adapter latch receptacles 54*a*, 54*b* (see FIG. 12) when the main grip-sleeve body 38 is in the forward position relative to the connector body 22 and the left and right adapter latch locks 40*a*, 40*b* are in the rearward position relative to the main grip-sleeve body 38. Similarly, the cover portions 134 of the left and right adapter latch locks 40*a*, 40*b* are also rearwardly displaced from the left and right adapter latch receptacles 54*a*, 54*b* when the main grip-sleeve body 38 is in the rearward position relative to the connector body 22 and the left and right adapter latch locks 40*a*, 40*b* are in the forward positions relative to the main grip-sleeve body 38.

It will be appreciated that the ability to rearwardly move the adapter latch locks 40*a*, 40*b* relative to the main grip-sleeve body 38 while the main grip-sleeve body 38 remains in its forward position relative to the connector body 22, and the ability of the main grip-sleeve body 38 to carry the adapter latch locks 40*a*, 40*b* rearwardly with it as the main grip-sleeve body 38 is moved rearwardly relative to the connector body 22, allow the multi-fiber fiber optic connector 20 to be effectively operated as a true push-pull connector. This allows the multi-fiber fiber optic connector 20 to be held by the main grip-sleeve body 38 as the multi-fiber fiber optic connector 20 is inserted into a fiber optic adapter, and as the multi-fiber fiber optic connector 20 is removed from a fiber optic adapter.

FIGS. 11-13 show a sequence for loading the multi-fiber fiber optic connector 20 into a fiber optic adapter 150. To insert the multi-fiber fiber optic connector 20 into the fiber optic adapter 150, the multi-fiber fiber optic connector 20 is grasped by the main grip-sleeve body 38 and is inserted into the port of the fiber optic adapter 150. FIG. 11 shows the multi-fiber fiber optic connector 20 and the fiber optic adapter 150 at the start of the insertion process. Continued movement of the multi-fiber fiber optic connector 20 into the fiber optic adapter 150, causes adapter latches 152 of the fiber optic adapter 150 to contact the left and right adapter latch locks 40a, 40b and to push the adapter latch locks 40a, 40b rearwardly relative to the connector body 22 and the main grip-sleeve body 38 to the rearward position (see FIG. 12) where the left and right adapter latch receptacles 54a, 54a are no longer covered by the adapter latch locks 40a, 40b. Once the adapter latch receptacles 54a, 54b are uncovered, the adapter latches 152 can snap into the adapter latch receptacles 54a, 54b as shown a FIG. 12. After the adapter latches 152 snap into the left and right adapter latch receptacles 54a, 54b, the adapter latches 152 move inwardly so as to no longer be in contact with the left and right adapter latch locks 40a, 40b. Thus, once the adapter latches 152 move inwardly into the adapter latch receptacles 54a, 54b, the left and right grip-sleeve assembly springs 42a, 42b cause the left and right adapter latch locks 40a, 40b to move back to their forward positions relative to the main grip-sleeve body 38 (see FIG. 13). With the left and right adapter latch locks 40a, 40b in their forward positions, the cover portions of the left and right adapter latch locks 40a, 40b cover the adapter latches 152 within the left and right adapter latch receptacles 54a, 54b so as to prevent the adapter latches 152 from flexing outwardly to disengage from the adapter latch receptacles 54a, 54b. Thus, the adapter latches 152 are effectively locked within the left and right adapter latch receptacles 54a, 54b by the cover portions 134 of the left and right adapter latch locks 40a, 40b.

While the main grip-sleeve body 38 is in its forward position relative to the connector body 22 and the left and right adapter latch locks 40a, 40b are in their forward positions relative to the main grip-sleeve body 38 with the cover portions 134 covering the adapter latches 152 within the adapter latch receptacles 54a, 54b, the adapter latches 152 are prevented from disengaging from the adapter latch receptacles 54a, 54b and the multi-fiber fiber optic connector 20 is prevented from being removed from the fiber optic adapter 150. To remove the multi-fiber fiber optic connector 20 from the fiber optic adapter 150, the main grip-sleeve body 38 is grasped and is pulled from its forward position (see FIG. 15) relative to the connector body 22 to its rearward position (see FIG. 16) relative to the connector body 22. As the main grip-sleeve body 38 is moved to is rearward position relative to the connector body 22, it carries the left and right adapter latch locks 40a, 40b rearwardly with it such that the cover portions 134 of the adapter latch locks 40a, 40b uncover the adapter latches 152 within the left and right adapter latch receptacles 54a, 54b thereby allowing the adapter latches 152 to flex outwardly and to disengage from the left and right adapter latch receptacles 54a, 54b. Specifically, with the latches 152 uncovered, by pulling the connector 20 via the grip-sleeve 38, opposing ramped surfaces of the adapter latches 152 and the latch receptacles 54a, 54b cause the adapter latches 152 to flex out of the adapter latch receptacles 54a, 54b as the connector 20 is pulled.

Figure 14:
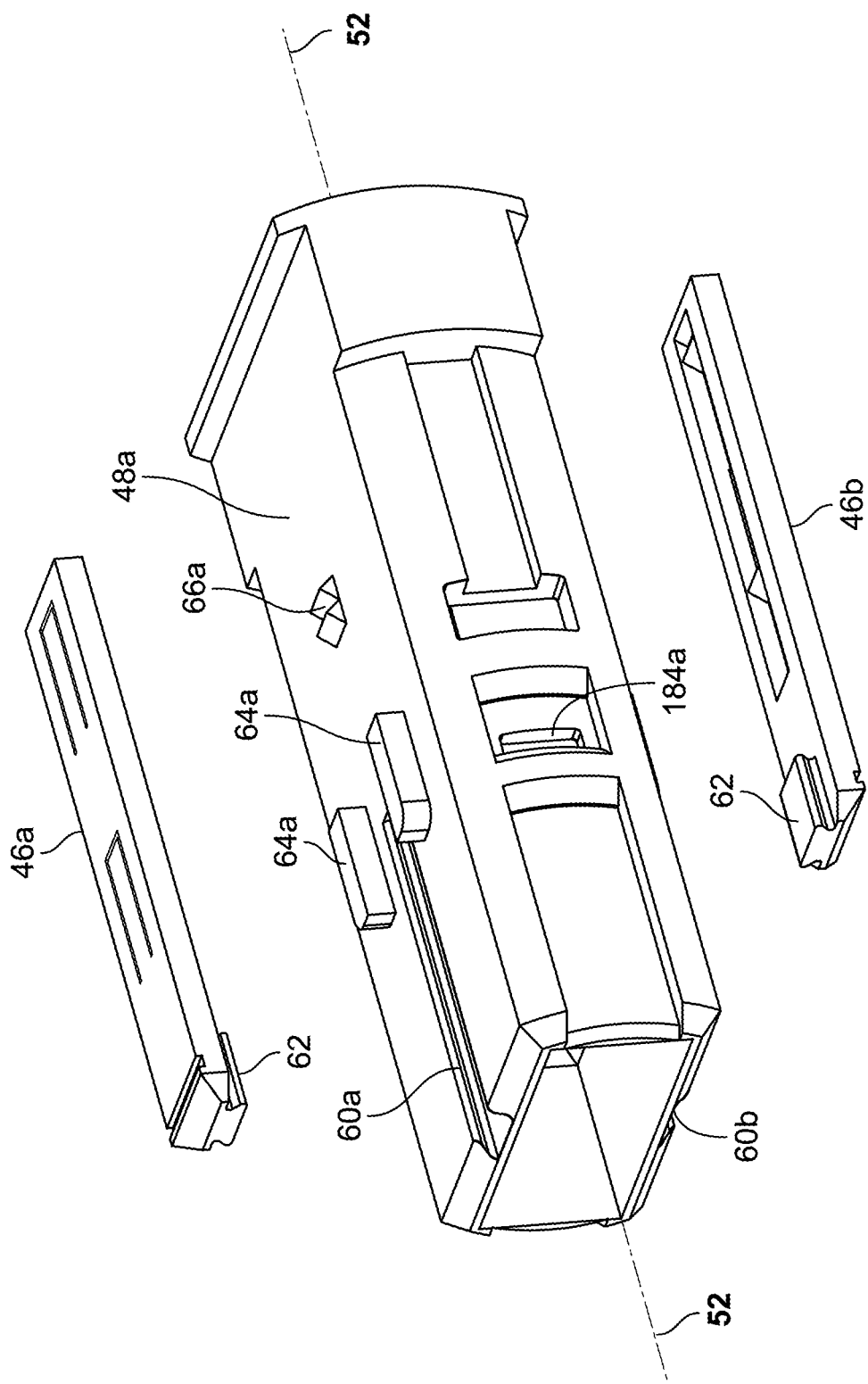
FIG. 14 depicts a connector body and upper and lower keys of the multi-fiber fiber optic connector of FIG. 1.

As best shown at FIGS. 14-16, the upper and lower keys 46a, 46b re mounted to slide respectively at the upper and lower major sides 48a, 48b of the connector body 22. The upper and lower keys 46a, 46b can be slid longitudinally along the longitudinal axis 52 relative to the connector body 22 between extended positions (see the upper key 46a at FIGS. 15 and 16) and retracted positions (see the lower key 46b at FIGS. 15 and 16). When the keys 46a, 46b are in the extended position, forward portions of the keys extend forwardly from the outer grip-sleeve assembly 36 a substantial distance along the forward portion of the connector body 22. When the upper and lower keys 46a, 46b are in the retracted positions, the forward portions of the upper and lower keys 46a, 46b are preferably retracted at least substantially within the main grip-sleeve body 38.

As shown at FIG. 15, the projections 62 of the upper and lower keys 46a, 46b fit within the upper and lower key mounting slots 60a, 60b to provide sliding connections between the upper and lower keys 46a, 46b and the connector body 22. In certain examples, the upper and lower keys 46a, 46b can include front notches 154 that can be accessed with a tool to facilitate pulling the upper and lower keys 46a, 46b outwardly from the main grip-sleeve body 38 from the retracted position to the extended position. In certain examples, the main grip-sleeve body 38 can include internal structure for accommodating the upper and lower keys 46a, 46b and for allowing the upper and lower keys 46a, 46b to slide relative to the main grip-sleeve body 38. For example, internal surfaces of the upper and lower major sides 110a, 110b of the main grip-sleeve body 38 can include key grooves 156 (see FIGS. 10, 15 and 16) for receiving the upper and lower keys 46a, 46b. The key grooves 156 can include outer portions 157 and central portions 158. The central portions 158 have greater groove depths as compared to the outer portions 157. The greater groove depths provided by the central portions 158 provide clearance for allowing forward and rearward latches 160, 162 of the upper and lower keys 46a, 46b to deflect outwardly from the major upper and lower sides 48a, 48b of the connector body 22 to allow the latches to move into engagement with the upper and lower key latch receptacles 66a, 66b and to also disengage from the upper and lower key latch receptacles 66a, 66b of the connector body 22.

Referring to FIG. 15, each of the upper and lower keys 46a, 46b has an elongate length that extends along the longitudinal axis 52 when the keys 46a, 46b are mounted on the connector body 22. The forward and rearward latches 160, 162 of the keys 46a, 46b are aligned along the longitudinal axis 52 when the upper and lower keys 46a, 46b are mounted within the upper and lower key mounting slots 60a, 60b. The forward and rearward latches 160, 162 are longitudinally spaced from one another. In certain examples, the forward and rearward latches 160, 162 can be configured as resilient cantilevers having base ends 163 unitarily formed with main bodies of the upper and lower keys 46a, 46b. The flexible cantilevers can include catches 164 at free ends of the cantilevers. The catches 164 can include angled forward and rearward ramp surfaces 166 that can engage corresponding ramp surfaces 168 of the upper and lower key latch receptacles 66a, 66b to allow the forward and rearward latches 160, 162 to flex outwardly to engage or disengage from the upper and lower key latch receptacles 66a, 66b. For example, by pulling pushing on the keys 46a, 46b, the ramp surfaces 166, 168 engage and slide across each other causing the keys 46a, 46b to flex away from the connector body 22. This allows the catches 164 to ride over the ramps 168 and into or out of the latch receptacles 66a, 66b.

The main grip-sleeve body 38 includes upper and lower key-latch blocking surfaces 170a, 170b that respectively block or cover the upper and lower key latch receptacles 66a, 66b when the main grip-sleeve body 38 is in the forward position relative to the connector body 22 (as shown at FIG. 15), and that are rearwardly offset from the key latch receptacle 66a, 66b when the main grip-sleeve body 38 is in the rearward position relative to the connector body 22 (as shown at FIG. 16). When the upper and lower keys 46a, 46b are latched relative to the key latch receptacles 66a, 66b (i.e., catches 164 of the latches 160 or 162 are positioned within the latch receptacles 66a, 66b) and the main grip-sleeve body 38 is in the forward position, the latch blocking surfaces 170a, 170b oppose the catches 164 and prevents the catches 164 from disengaging from the latch receptacles 66a, 66b. Thus, when the main grip-sleeve body 38 is in the forward position, the blocking surfaces 170a, 170b prevent the upper or lower keys 46a, 46b from being moved between the forward key position and the rearward position. In contrast, when the main grip-sleeve body 38 is moved to the rearward position relative to the connector body 22, the blocking surfaces 170a, 170b are offset from the latch receptacles 66a, 66b thereby enabling the keys 46a, 46b to be moved from the forward key position to the rearward key position by pushing the keys 46a, 46b rearwardly relative to the connector body 22, and also allow the keys 46a, 46b to be moved from the rearward key position to the forward key position by pulling the keys longitudinally forward relative to the connector body 22. Because the blocking surfaces 170a, 170b are offset from the latch receptacles 66a, 66b when the main grip-sleeve body 38 is retracted relative to the connector body 22, the latches 160, 162 are free to flex outwardly away from the major sides 48a, 48b of the connector body 22 into the central portions 158 of the key grooves 156 so as to allow the catches 164 to clear the retaining portions of the latch receptacles 66a, 66b as the latches 160 or 162 selectively engage with or disengage from the latch receptacles 66a, 66b. As described above, a ramp effect provided by the ramped surfaces 166, 168 causes the latches 160, 162 to flex away from the connector body 22 when the latches 160, 162 are pushed or pulled while the main grip-sleeve body 38 is in the rearward position of FIG. 16.

Referring to FIGS. 15 and 16, the upper key 46a can be moved from the depicted forward key position to the rearward key position by retracting the main grip-sleeve body 38 as shown at FIG. 16, and then pushing the upper key 46a rearwardly such that the catch 64 of the rear latch 162 disengages from the upper key latch receptacle 66a. Once the catch 164 of the rear latch 162 disengages from the latch receptacle 66a, the upper key 46a can be pushed rearwardly until the forward latch 160 engages with the latch receptacle 66a. Thereafter, the main grip-sleeve body 38 can be released and allow to return to the forward position relative to the connector body 22 by spring force provided by springs 42a, 42b such that the blocking surface 170a opposes the catch 164 of the forward latch 160 and locks the upper key 46a in the rearward key position. It will be appreciated that the lower key 46b can be moved from its forward position to its rearward position relative to the connector body 22 in a similar way as described above with respect to the upper key 46a.

Referring again to FIGS. 15 and 16, the lower key 46b is shown in the rearward key position. With the lower key 46b in the rearward position, the catch 164 of the forward latch 160 is in engagement with the lower latch receptacle 66b. With the main grip-sleeve body 38 in the forward position in FIG. 15, the lower key latch blocking surface 170b opposes the catch 164 of the forward latch 160 to prevent the catch 164 from disengaging from the lower key latch receptacle 66b. By moving the main grip-sleeve body 38 to the rearward position of FIG. 16, the lower key latch blocking surface 170b is preferably displaced from the catch 164 within the lower key latch receptacle 66b. Thus, the forward latch 160 is permitted to flex outwardly relative to the connector body 22. Therefore, with the main grip-sleeve body 38 in the retracted position of FIG. 16, the lower key 46b can be pulled longitudinally in a forward direction which causes the forward latch 160 to flex outwardly and disengage from the lower latch receptacle 166b. Continued forward movement of the lower key 46b toward the forward key position brings the catch 164 of the rearward latch 162 into engagement with the lower key latch receptacle 66b. Specifically, as the lower key 46b is moved forwardly, the catch 164 of the rearward latch 162 rides over the retaining features of the lower key latch receptacle 66b and nests within the pocket of the lower key latch receptacle 66b. Thereafter, the main grip-sleeve body 38 is released thereby allowing it to return by spring force to the forward position where the lower blocking surface 170b prevents the catch 164 of the rearward latch 162 from disengaging from the latch receptacle 66b. It will be appreciated that the upper key 46a can be moved from its rearward position to its forward position relative to the connector body 22 in a similar way as described above with respect to the lower key 46b.

During changing of the upper and lower keys 46a, 46b between the forward key position and the rearward key position, the main grip-sleeve body 38 is preferably manually held in the rearward position of FIG. 16 against the bias of the left and right grip-sleeve assembly springs 42a, 42b. Once the upper and lower keys 46a, 46b are in their desired forward and/or rearward key positions relative to the connector body 22, the main grip-sleeve body 38 can be released thereby allowing the springs 42a, 42b to return the main grip-sleeve body 38 to its forward position of FIG. 15 where the blocking surfaces 170a, 170b prevent the latches 160, 162 from disengaging from their corresponding latch receptacles 66a, 66b.

When the upper key 46a is in the forward key position, the upper key 46a is not visible through the upper viewing window 118a. In contrast, when the upper key 46a is in the rearward key position, the upper key 46a is visible through the upper viewing window 118a. It will be appreciated that the upper viewing window 118a is positioned to be located outside the fiber optic adapter 150 when the multi-fiber fiber optic connector 20 is loaded within the fiber optic adapter 150. Therefore, even when the multi-fiber fiber optic connector 20 is secured within the fiber optic adapter 150, the upper viewing window 118a allows an operator to identify the position of the upper key 46a.

When the lower key 46b is in the rearward key position as shown at FIGS. 15 and 16, the lower key 46b is visible through the lower viewing window 118b. The lower viewing window 118b is positioned so as to be located outside the fiber optic adapter 150 when the multi-fiber fiber optic connector 120 is secured within the port of the fiber optic adapter 150. Therefore, the lower viewing window 118b allows the position of the lower key 46b to be visually determined even when the multi-fiber fiber optic connector 20 is secured within the fiber optic adapter 150. When the lower key 46b is in the forward key position, the lower key 46b is not visible through the lower viewing window 118b. Therefore, the presence or absence of the lower key 46b at the lower viewing window 118b allows for the position of the lower key 46b to be determined visually even when the multi-fiber fiber optic connector 20 is positioned within the fiber optic adapter 150.

It will be appreciated that the multi-fiber fiber optic connector 20 includes features for allowing the rear spring stop 32 to be disengaged from the connector body 22. For example, the cover portions 134 of the left and right adapter latch locks 40a, 40b can include openings 172 configured for receiving a tool. By manually pulling the main grip-sleeve body 38 against the bias of the springs 42a, 42b from the forward position to the rearward position relative to the connector body 22, the openings 172 are brought into alignment with the left and right openings 104a, 104b defined through the minor sides of the connector body 22. As indicated previously, the retention tabs 102 of the rear spring stop 32 fit within the openings 104a, 104b. Therefore, when the main grip-sleeve body 38 is retracted to bring the openings 172 in alignment with the openings 104a, 104b, a tool can be inserted through the openings 172 and used to disengage the retention tabs 102 of the latching arms 100a, 100b from the openings 104a, 104b to allow the rear spring stop 32 to be removed from the interior of the connector body 22.

It will be appreciated that the pin retention structure 92 of the ferrule assembly 28 includes structure for selectively retaining the ferrule alignment pins 88a, 88b within the alignment pin openings 90a, 90b. It is preferred for the structure to be accessible from outside the multi-fiber fiber optic connector 20 to allow the ferrule alignment pins 88a, 88b to be released from the alignment pin openings 90a, 90b to convert the multi-fiber fiber optic connector from a male configuration to a female configuration. Thus, the pin retention arrangement 92 preferably includes retaining elements or structures that are movable between retaining positions and release positions. In preferred examples, retaining structures can include resilient or spring-like structures that are inherently spring biased toward the retaining positions that can be moved to the released positions by means such as a tool. Preferably, the tool can be inserted into the multi-fiber fiber optic connector 20 without requiring disassembly of the multi-fiber fiber optic connector 20.

FIGS. 17-20 show an example configuration for the pin retention structure 92. The pin retention structure 92 is adapted to secure the ferrule alignment pins 88a, 88b within the alignment pin openings 90a, 90b, and can be released to allow removal of the alignment pins 88a, 88b from the alignment pin openings 90a, 90b. In the depicted example, the pin retention structure 92 has a metal construction such as a sheet-metal construction. The pin retention structure 92 includes left and right resilient spring elements 174a, 174b that in certain examples include pin retaining portions 175a, 175b that are movable between pin retaining positions (see solid line at FIG. 20) and pin release positions (see phantom line at FIG. 20). In the pin retaining positions, the pin retaining portions 175a, 175b fit within the circumferential retention grooves 94 of the ferrule alignment pins 88a, 88b to prevent the ferrule alignment pins 88a, 88b from being removed from the alignment pin openings 90a, 90b. In the pin release positions, the pin retaining portions 175a, 175b are displaced the circumferential retention grooves 94 of the ferrule alignment pins 88a, 88b such that the ferrule alignment pins 88a, 88b can be removed from the alignment pin openings 90a, 90b without interference from the pin retaining portions 175a, 175b. The left and right resilient spring elements 174a, 174b spring bias the pin retaining portions 175a, 175b in a direction toward the pin retaining positions.

The pin retention structure 92 includes a main body 220 having a front side 222 and a rear side 224. The ferrule boot 96 can extend axially through an open central region 225 of the main body 220. The left and right resilient spring elements 174a, 174b are depicted as cantilever springs having lengths that extend along and are generally parallel to the longitudinal axis 52 of the connector 20 (see FIG. 8) when the connector is assembled. The resilient spring elements 174a, 174b include base ends 226 (see FIG. 19) unitarily formed with the main body 220 at the rear side 224 of the main body 220, and free ends 228 (see FIG. 19) located at the front side 222 of the main body 220. The pin retaining portions 175a, 175b are depicted as inward projections/tabs at the free ends 228 of the resilient spring elements 174a, 174b. The base ends 226 form primary resilient flex locations for the resilient spring elements 174a, 174b, although the spring elements 174a, 174b also flex along their lengths. The main body 220 defines left and right notches 230a, 230b (see FIG. 17) that co-axially align with the alignment pin openings 90a, 90b when the connector 20 is assembled. The left and right notches 230a, 230b are defined at the front side 222 of the main body 220 and are adapted for receiving rear ends of the pins 88a, 88b when the pins 88a, 88b are installed in the ferrule 80. The left and right notches 230a, 230b are positioned on opposite sides of the open central region 225 of the main body 220. The pin retaining portions 175a, 175b align with the left and right notches 230a, 230b and are positioned laterally outside the notches 230a, 230b. The spring elements 174a, 174b include stop portions 177a, 177b (see FIG. 17) at the free ends 228 that abut against sides of the main body 220 when the retaining portions 175a, 175b are in the pin retaining positions. The left and right spring elements 174a, 174b include release tabs 179a, 179b at the free ends 228. The release tab 179a of the left resilient spring element 174a projects below the main body 220 and the release tab 179b of the right resilient spring element 174b projects above the main body 220.

In certain examples, the connector body 22 defines left and right pin release access openings 184a, 184b (see FIG. 8) that are respectively defined through the minor sides 50a, 50b of the connector body 22 at the pockets of the left and right adapter latch receptacles 54a, 54b. The left and right access openings 184a, 184b can be accessed by manually pulling back the main grip-sleeve body 38 against the bias of the springs 42a, 42b from the forward position to the rearward position. When the main grip-sleeve body 38 is in the rearward position, the pin release access openings 184a, 184b are exposed. At least portions of the release tabs 179a, 179b overlap or align with the release pin openings 184a, 184b. As described below, by pulling back the main grip-sleeve body 38 to expose the left and right pin release access openings 184a, 184b, a release tool can be inserted through the openings 184a, 184b to move the pin retaining portions 175a, 175b to the pin release positions so that the ferrule alignment pins 88a, 88b can be removed from their corresponding alignment openings 90a, 90b by pulling the pins 88a, 88b forwardly from the openings 90a, 90b. In certain examples, it may be necessary to push the ferrule 80 rearwardly into the connector body 22 against the bias of the spring 30 to bring the tabs 179a, 179b into alignment with the openings 184a, 184b.

Figure 20:
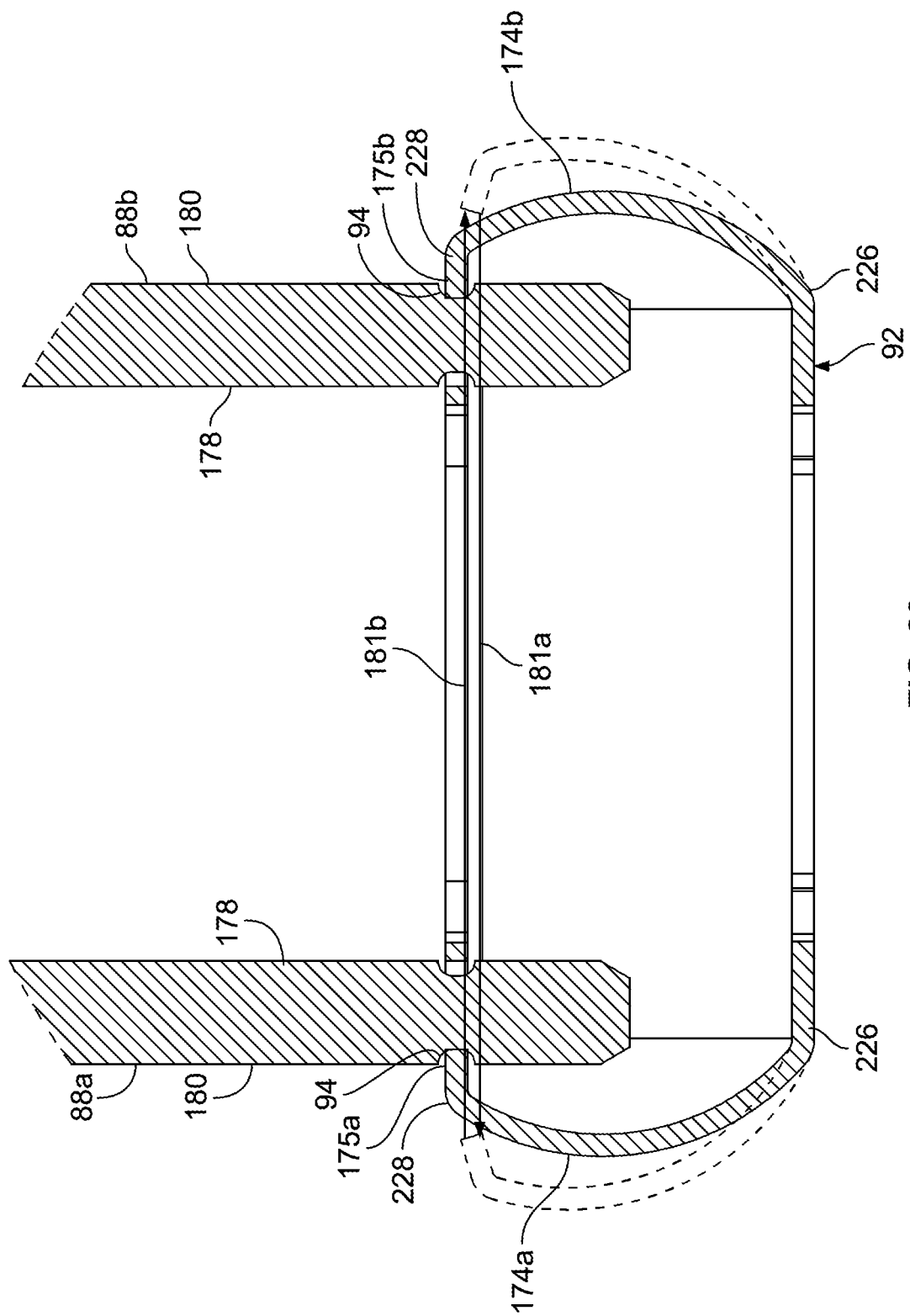
FIG. 20 shows the pin retainer of FIG. 17 with retaining portions of the pin retainer positioned within retention grooves of the alignment pins of the multi-fiber fiber optic connector of FIG. 1.
Figure 21:
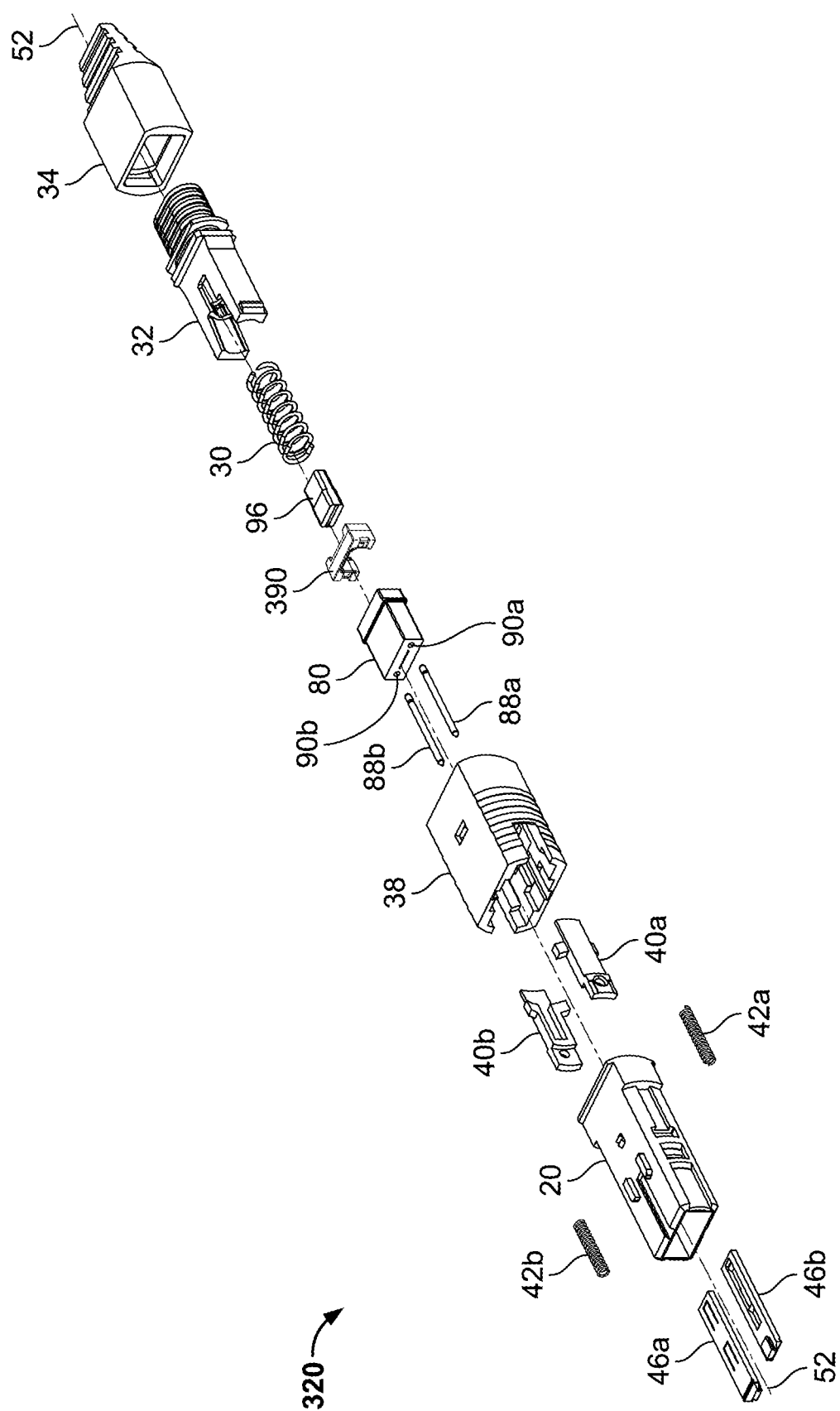
FIG. 21 is an exploded view of another multi-fiber fiber optic connector in accordance with the principles of the present disclosure.

As shown at FIG. 20, the alignment pins 88a, 88b have inner sides 178 that face toward each other and toward the central longitudinal axis 52 of the fiber optic connector, and outer sides 180 that face away from each other and away from the longitudinal axis 52. The pin retaining portions 175a, 175b of the resilient spring elements 174a, 174b insert within the circumferential grooves 94 of the alignment pins 88 at the outer sides 180 of the alignment pins 88a, 88b. To disengage the pin retaining portions 175a, 175b from the circumferential grooves 94, it is necessary to flex the resilient spring elements 174a, 174b outwardly away from the central longitudinal axis 52 as shown in phantom line at FIG. 20.

It will be appreciated that a tool or tools can be used from outside the multi-fiber fiber optic connector 20 to apply release forces to the tabs 179a, 179b of the left and right resilient elements 174a, 174b to move the retaining portions 175a, 175b from the retaining positions to the release positions. To move the left resilient spring element 174a engaging the left ferrule alignment pin 88a from the retaining position to the release position, the main grip-sleeve body 38 is retracted and a tool is inserted through the right pin release access opening 184b to engage the tab 179a of the left resilient spring element 174a and push the left spring retaining portion 175a outwardly from the left ferrule alignment pin 88a to the pin release position such that the ferrule alignment pin 88a can be removed from the opening 90a. It will be appreciated that during the insertion process, the tool (shown schematically at FIG. 17 by arrow 181a) extends from the right pin release access opening 184b beneath the main body 220 of the pin retention structure 92 and across the width of the fiber optic connector 20 to the left tab 179a. To disengage the pin retaining portion 175b of the right resilient retaining element 174b from the circumferential groove 94 of the right ferrule alignment pin 88b, the main grip-sleeve body 38 is retracted to the rearward position and a tool is inserted through the left pin release access opening 184a and used to engage the release tab 179b of the right resilient retaining element 174b to push the right resilient retaining element 174b outwardly from the right ferrule alignment pin 88b to disengage the right resilient retention element 174b from the right ferrule alignment pin 88b. Once the right retaining element 174b is outwardly displaced from the circumferential groove 94 of the right alignment pin 88b, the right alignment pin 88b can be withdrawn from the right alignment pin opening 90b. During use of the tool to move the right resilient retaining element 174b to the pin release position, the tool (shown schematically at FIG. 17 by arrow 181b) travels from the left pin release opening 184a over the top side of the main body 220 of the pin retention arrangement 92 and across the width of the multi-fiber fiber optic connector 20 to the right release tab 179b.

Figure 22:
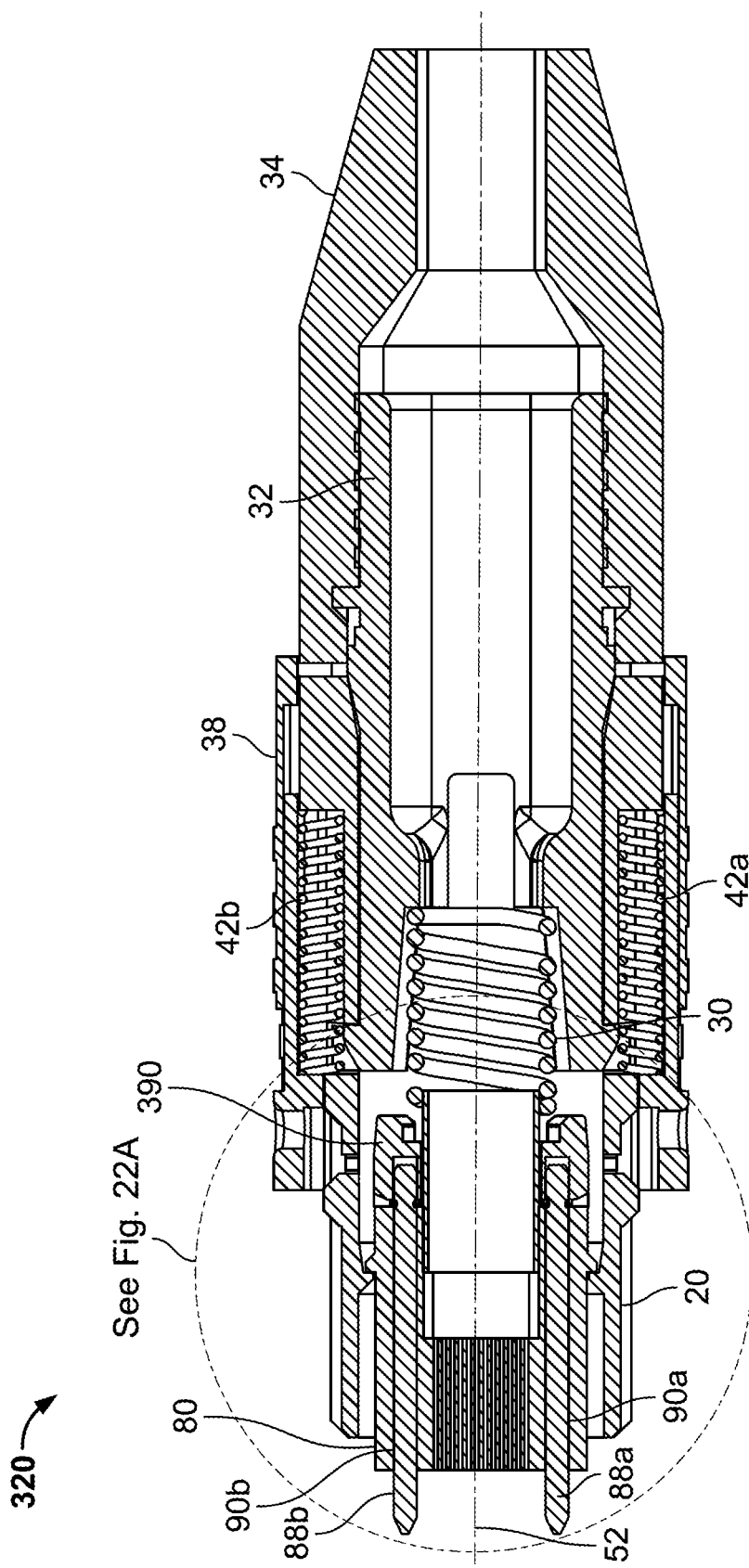
FIG. 22 is a cross-sectional view taken lengthwise through the multi-fiber fiber optic connector of FIG. 21.
Figure 22A:
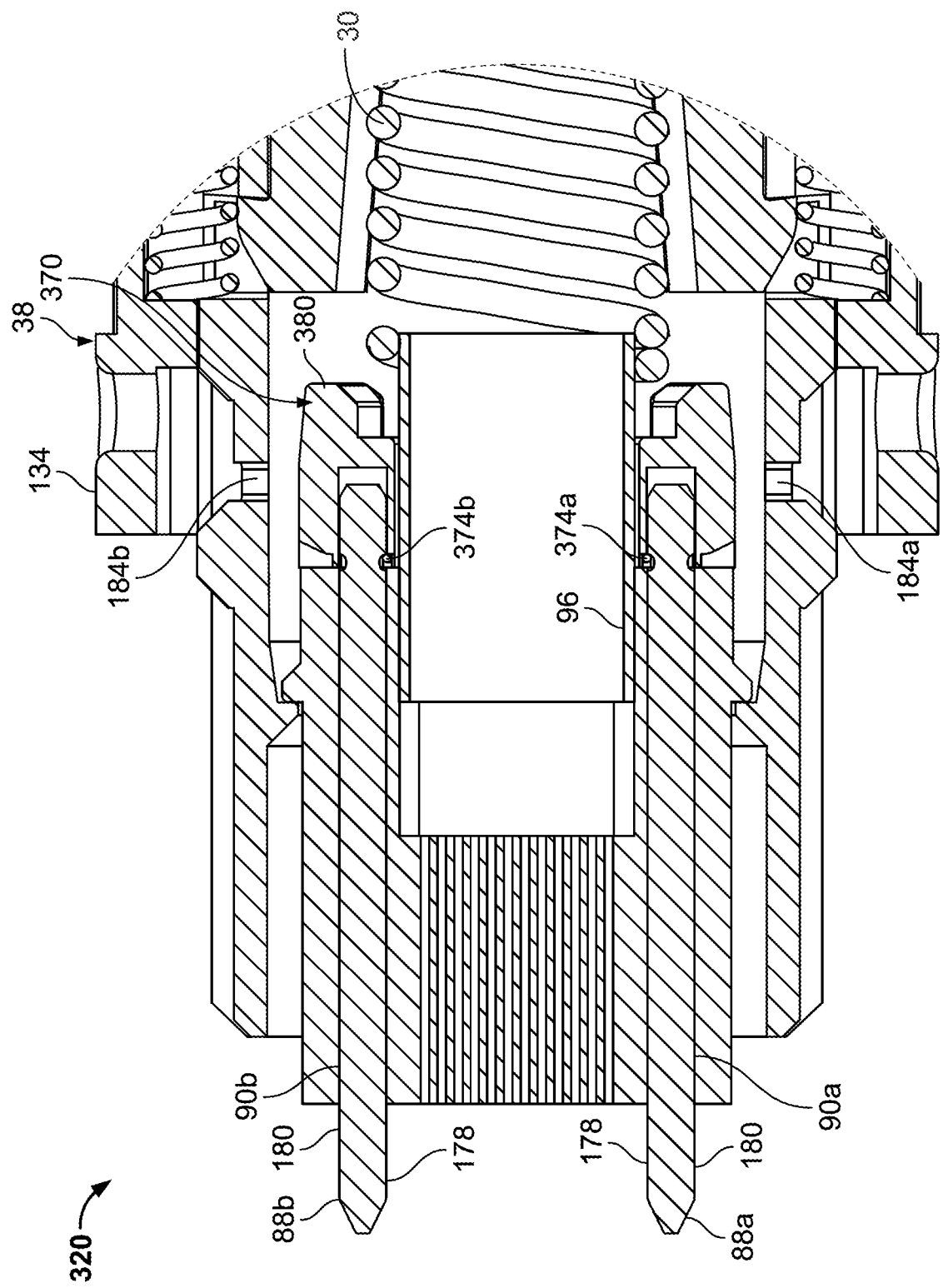
FIG. 22A is an enlarged view of a portion of FIG. 22.
Figure 23:
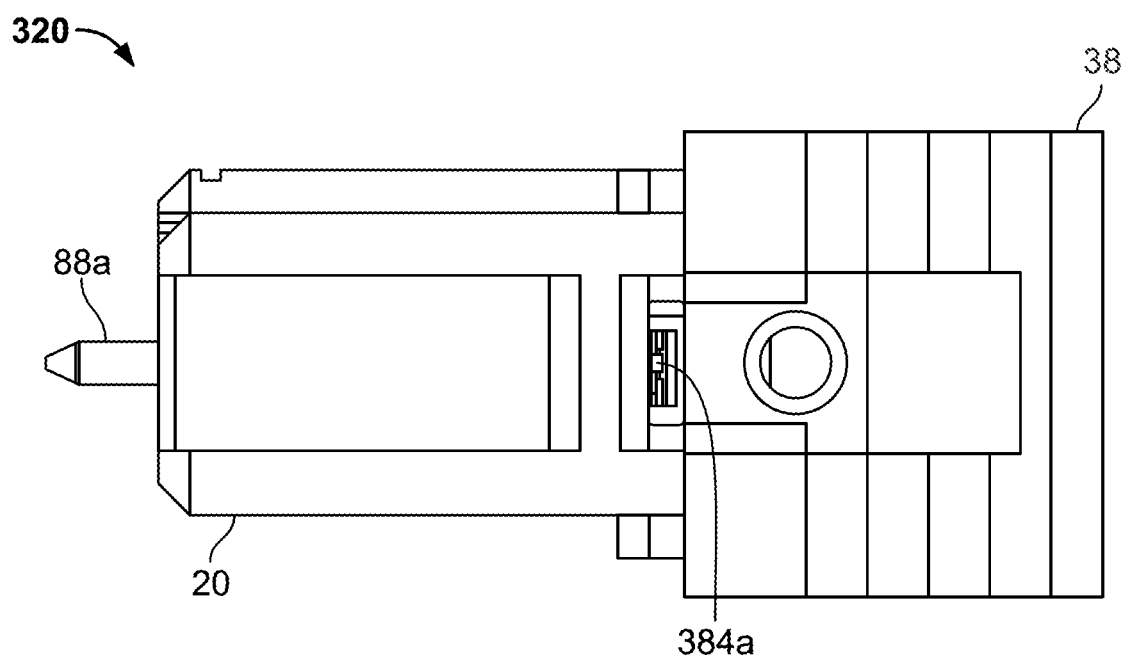
FIG. 23 is a side view of a portion of the multi-fiber fiber optic connector of FIG. 21.
Figure 24:
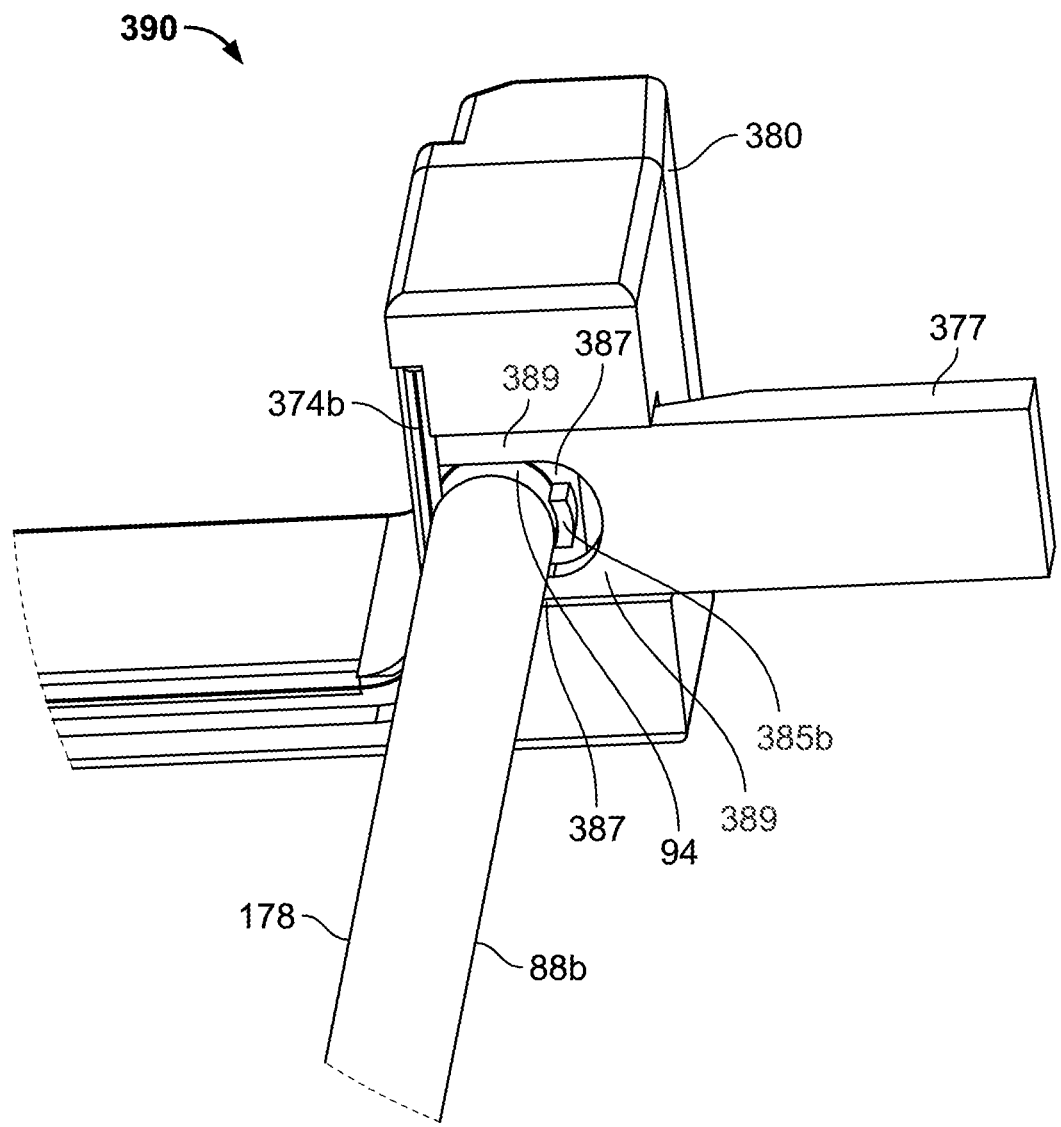
FIG. 24 shows a tool being used to disengage a pin retention structure of the multi-fiber fiber optic connector of FIG. 21.
Figure 25:
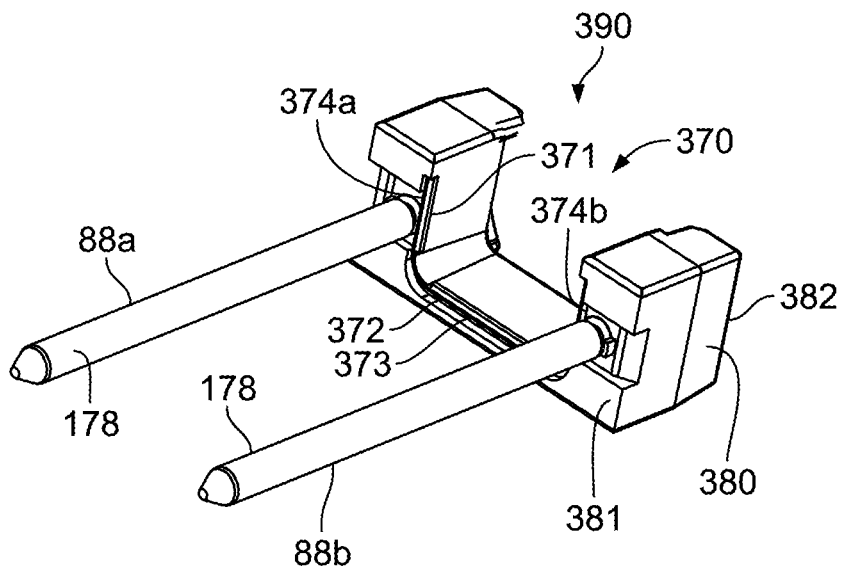
FIG. 25 shows a pin retention structure of the multi-fiber fiber optic connector of FIG. 21, the pin retention structure is shown interlocked with alignment pins of the multi-fiber fiber optic connector of FIG. 21.
Figure 26:
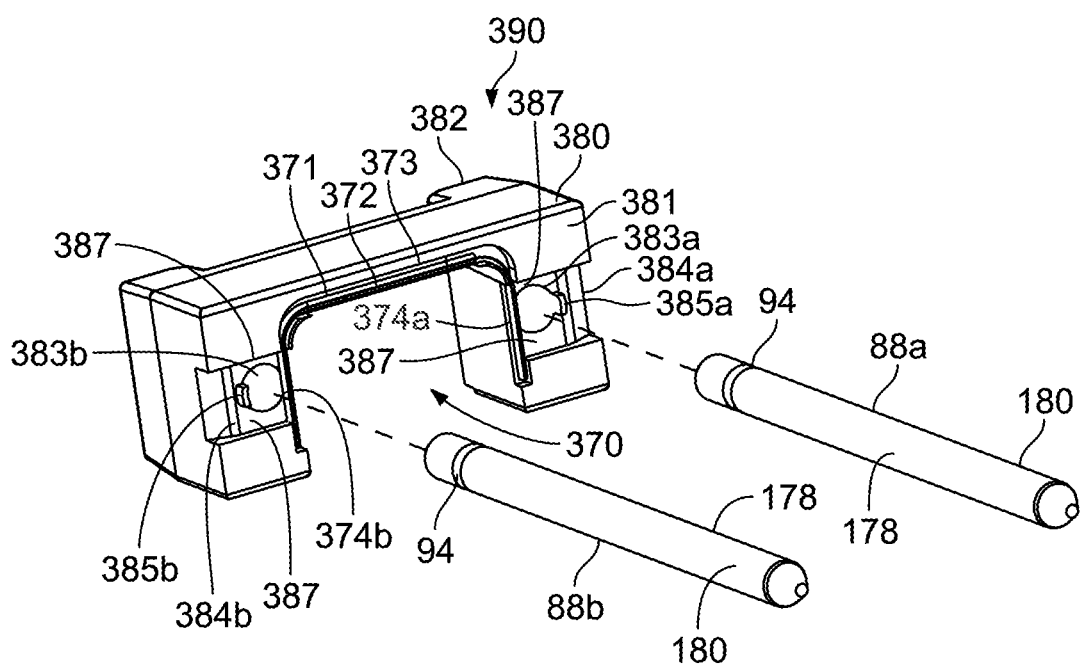
FIG. 26 shows the pin retention structure of FIG. 25 with the alignment pins disengaged from the pin retention structure.

FIGS. 21-26 show another multi-fiber fiber optic connector 320 in accordance with the principles of the present disclosure. The multi-fiber connector 320 has the same construction and arrangement as the multi-fiber fiber optic connector 20, except the multi-fiber fiber optic connector 320 includes a modified pin retention structure 390 for retaining the alignment pins 88a, 88b within the alignment pin openings 90a, 90b of the multi-fiber ferrule 80. The pin retention structure 390 includes a main body 380 that is held against the back end of the ferrule 80 by the ferrule spring 30. The main body 380 can have a molded, dielectric (e.g., plastic) construction. As shown at FIGS. 25 and 26, the main body 380 is generally U-shaped and defines an open central region 370 through which the ferrule boot 96 extends (see FIG. 22A). The main body 380 includes a front side 381 and a rear side 382. The main body 380 defines left and right pin openings 383a, 383b that extend axially through the main body 380 from the front side 381 to the rear side 382. The pin openings 383a, 383b are on opposite sides of the open central region 370. The left and right pin openings 383a, 383b are adapted to receive rear ends of the ferrule alignment pins 88a, 88b. Left and right side notches 384a, 384b be are provided adjacent the left and right pin openings 383a, 383b. Left and right tool stops 385a, 385b are provided within the left and right side notches 384a, 384b outside the left and right pin openings 383a, 383b. The left and right notches 384a, 384b are adapted to provide upper and/or lower open tool paths 385 that extend laterally through the left and right sides of main body 380 and laterally over or under the ferrule alignment pins 88a, 88b when the ferrule alignment pins 88a, 88b are received within the pin openings 383a, 383b. The left and right notches 384a, 384b align with the left and right pin release access openings 184a, 184b by moving the ferrule 80 to a rearward position relative to the connector body 22 against the bias of the ferrule spring 30.

The front side 381 of the main body 380 defines a U-shaped channel 371 for receiving a U-shaped alignment pin retainer 372. The alignment pin retainer 372 can be a metal wire forming a clip. The alignment pin retainer 372 includes a base portion 373 that extends across the open central region 370 and across a width of the fiber optic connector 320. The alignment pin retainer 372 includes left and right resilient spring elements 374a, 374b that correspond to each of the left and right pin openings 383a, 383b. The resilient spring elements 374a, 374b are formed as legs that project from opposite ends of the base portion 373. The resilient spring elements 374a, 374b are resilient cantilevers having base ends integral with the base portion 373 and free ends spaced from the base portion 373. In certain examples, the resilient spring elements 374a, 374b have lengths that are generally perpendicular to the longitudinal axis 52 and to the ferrule alignment pins 88a, 88b. When the ferrule alignment pins 88a, 88b are installed within the openings 90a, 90b, the rear ends of the pins 88a, 88b fit within the left and right pin openings 383a, 383b of the main body 380 of the pin retention structure 390, and pin retention portions of the resilient spring elements 374a, 374b fit within the circumferential retention grooves 94 of the pins 88a, 88b. The resilient spring elements 374a, 374b fit within the circumferential grooves 94 at the inner sides 178 of the alignment pins 88a, 88b. The resilient spring elements 374a, 374b are spring biased toward pin retaining positions within the grooves 94 at the inner sides 178 of the pins 88a, 88b. The resilient spring elements 374a, 374b are moved from the pin retaining positions to the pin release positions by flexing the resilient spring elements 374a, 374b away from the pins 88a, 88b inwardly toward the central longitudinal axis 52. Once the resilient spring elements 374a, 374b have been flexed to the pin release positions, the pins 88a, 88b can be pulled forwardly from the alignment pin openings 90a, 90b to remove the pins 88a, 88b from the ferrule 80.

To remove the right ferrule alignment pin 88b from the right alignment pin opening 90b, the ferrule 80 is moved to the rearward position relative to the connector body 22 to bring the right side notch 384b into alignment with the right pin release access opening 184b of the connector body. The main grip-sleeve body 38 is also moved to its rearward position relative to the connector body 22 to expose the right pin release access openings 184b (see FIG. 23). A tool 377 (see FIG. 24) is then used to push the right resilient spring element 374b inwardly to the pin release position by inserting the tool through the right pin release access opening 184b and through the open lateral tool paths 387 of the right side notch 384b to engage the right resilient spring element 374b. The tool 377 can have a forked end with extensions 389 that extend along/through the tool paths 385 above and below the alignment pin 88b to reach the right resilient spring element 374b at the inner side 178 of the pin 88b. The right tool stop 385b limits the insertion depth of the tool 377. Once the tool 377 has moved the right resilient spring element 374b to the pin release position, the right pin 88b can be pulled forwardly from the ferrule 80. It will be appreciated that the left pin 88a can be removed in a similar way by inserting the tool 377 through the left pin release access opening 184a and the tool paths 387 of the left side notch 384a to move the left resilient spring element 374a to the pin release position thereby allowing the left pin 88a to be pulled forwardly from the ferrule 80.

Figure 36:
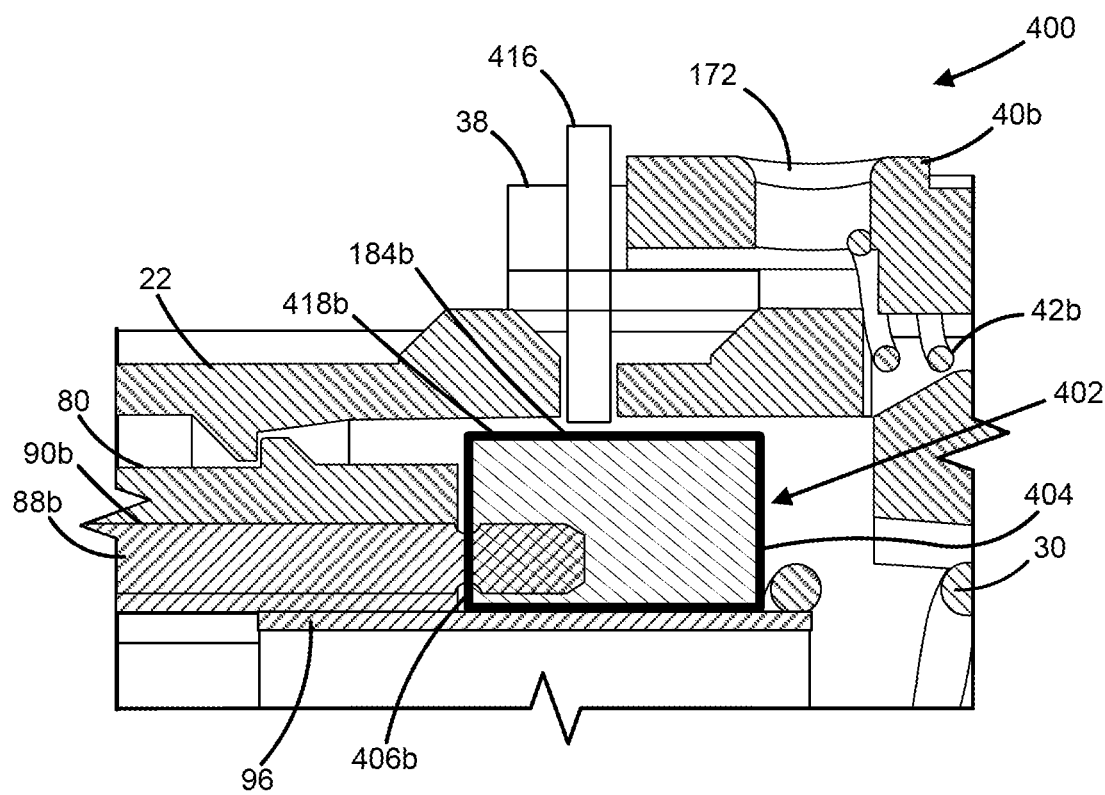
FIG. 36 is a partial cross-sectional view taken lengthwise through another multi-fiber fiber optic connector in accordance with the principles of the present disclosure.
Figure 37:
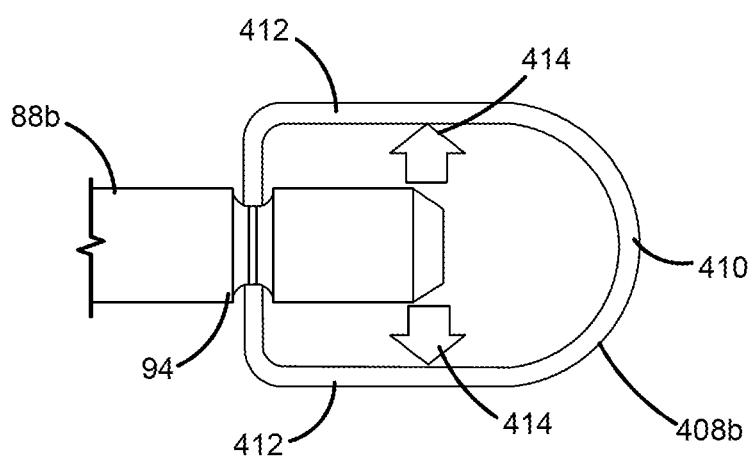
FIG. 37 is a side view of a pin retention structure of the multi-fiber fiber optic connector of FIG. 36, the pin retention structure is shown interlocked with alignment pins.

FIGS. 36 and 37 show another multi-fiber fiber optic connector 400 in accordance with the principles of the present disclosure. Referring concurrently to FIGS. 36 and 37, certain components are described above, and thus, are not necessarily described further. The multi-fiber fiber optic connector 400 has the same construction and arrangement as the multi-fiber fiber optic connectors described above (e.g., connectors 20 and 320), except the connector 400 includes anther configuration of a pin retention structure 402 for retaining the alignment pins 88b within the alignment pin openings 90b of the multi-fiber ferrule 80. The pin retention structure 402 includes a main body 404 that is held against the back end of the ferrule 80 by the ferrule spring 30. The main body 404 can have a molded, dielectric (e.g., plastic) construction. For example, the main body 404 may be generally U-shaped such that the ferrule boot 96 can extend therein. The main body 404 defines pin openings 406b that extend axially through the main body 404 from the front side. The pin openings 406b are on opposite sides of the ferrule boot 96 (the left side pin opening 406a is not illustrated in FIG. 36) and are adapted to receive rear ends of the ferrule alignment pins 88b.

The main body 404 is sized and shaped to support an alignment pin retainer 408b (shown in FIG. 37). The alignment pin retainer 408b can be a substantially U-shaped metal wire and include a base 410 with two opposing resilient spring elements 412 extending therefrom. The resilient spring elements 412 are formed as generally L-shaped legs that are resilient cantilevers and with lengths that are substantially parallel to the longitudinal axis 52 (shown in FIG. 7) and to the ferrule alignment pin 88b. When the ferrule alignment pin 88b is installed within the opening 90b, the rear end of the pin 88b fits within the pin opening 406b of the main body 404 of the pin retention structure 402, and pin retention portions of the resilient spring elements 412 fit within the circumferential retention groove 94 of the pin 88b. In this example, the resilient spring elements 412 fit within the circumferential groove 94 at two different locations approximately 180° apart from one another (e.g., at a top and a bottom location on the ferrule alignment pin 88b) so as to retain the ferrule alignment pin 88b to the pin retention structure 402. The resilient spring elements 412 are spring biased toward pin retaining positions within the groove 94 of the pin 88b. The resilient spring elements 412 are moved from the pin retaining position (shown in FIG. 37) to the pin release position by flexing the resilient spring elements 412 away from the pin 88b. In this example, the resilient spring elements 412 are flexed away from the pin 88b and in a direction illustrated by arrows 414 that are substantially orthogonal to the longitudinal axis 52. Once the resilient spring elements 412 have been flexed to the pin release position, the pin 88b can be pulled forwardly from the alignment pin opening 90b to remove the pin 88b from the ferrule 80.

In reference to FIGS. 36 and 37, only the right side ferrule alignment pin 88b and the alignment pin retainer 408b are shown and described. It is appreciated that a corresponding left side alignment pin retainer 408a (not shown) can also be supported by the main body 404 and which similarly retains the left side ferrule alignment pin 88a. To remove the ferrule alignment pin 88b, the main grip-sleeve body 38 is moved to its rearward position relative to the connector body 22 to expose the pin release access opening 184b. A tool 416 (shown in FIG. 36) is then used as a wedge to push the resilient spring elements 412 away from the pin 88b (as shown with direction arrows 414). In some examples, the main body 404 may have a tool path opening 418b defined on the sides so that the tool 416 can reach the alignment pin retainer 408a. In other examples, the sides of the main body 404 may be substantially open so as to enable access to the alignment pin retainer 408 by the tool 416. In either example, the access to the pin retainer 408 is on a side of the main body 404 that is substantially orthogonal to the front of the main body 404 that has the opening 406b that the pin 88b extends through. In the example, the tool 416 can have a wedge shaped end that pushes the resilient spring element 412 away from each other. Once the tool 416 has moved the resilient spring elements 412 to the pin release position, the pin 88b can be pulled forwardly from the ferrule 80.

To load one of the ferrule alignment pins of the type disclosed herein into one of the ferrule alignment pin openings of the type disclosed herein, the alignment pin is inserted rearwardly into the alignment pin openings. During the insertion process, the rear end of the alignment pin engages the pin retaining portion of the corresponding resilient spring element thereby forcing the pin retaining portion to flex from the pin retaining position to the pin release position. Alternatively, a tool can be used to move the pin retaining portion to the pin release position. With continued rearward insertion of the alignment pin, the rear end of the pin moves past the pin retaining portion and the pin retaining portion engages and slides along the side of the pin such that the side of the pins holds the pin retaining portion in the pin release position. When the circumferential groove of the alignment pin moves into alignment with the pin retaining portion of the resilient spring element, the pin retaining portion snaps into the circumferential groove and thereby moves from pin release positions to the pin retaining positions such that the alignment pin is locked/retained within the alignment pin opening. The movement of the resilient spring element from the pin retaining position to the pin release position is caused by the inherent elasticity/resiliency of the resilient spring element. To release/unlock the alignment pin from the alignment pin retention structure so as to allow removal of the alignment pin from the multi-fiber ferrule, a tool can be used to move the pin retaining portion from the pin retaining position to the pin release position. With the pin retaining portion held in the release position, the alignment pin can be pulled forwardly out of the alignment pin opening.

In certain examples, the resilient spring elements of the pin retention structures disclosed herein include resilient cantilever arms having lengths that extend between base ends and opposite free ends. In certain examples, the resilient cantilever arms are oriented with their lengths parallel to the alignment pins. In certain examples, the resilient cantilever arms are oriented with their lengths perpendicular to the alignment pins. In certain examples, the resilient cantilever arms are oriented parallel to the alignment pins and include release tabs that extend higher or lower than the alignment pins. In certain examples, the resilient cantilever arms are oriented perpendicular relative to the alignment pins and the free end portions of the resilient cantilever arms project higher or lower than the alignment pins.

In certain examples, the ferrule alignment pins of the type disclosed herein include inner sides that face toward each other and toward a central longitudinal axis of the fiber optic connector, and also include outer sides that face away from each other and away from the central longitudinal axis of the fiber optic connector. In certain examples, the pin retaining portions of the resilient spring elements fit within the circumferential grooves of the alignment pins at the inner sides of the alignment pins, and are moved from the pin retaining positions to the pin release positions by flexing the resilient spring elements inwardly toward the central longitudinal axis of the fiber optic connector. In certain examples, the pin retaining portions of the resilient spring elements fit within the circumferential grooves of the alignment pins at the outer sides of the alignment pins, and are moved from the pin retaining positions to the pin release positions by flexing the resilient spring elements outwardly away from the central longitudinal axis of the fiber optic connector. In certain examples, the pin retaining portions of the resilient spring elements fit within the circumferential grooves of the alignment pins at two or more locations, and are moved from the pin retaining position to the pin release positions by flexing the resilient spring elements outwardly away from the elongated alignment pin. In certain examples, the two or more locations can be at a top and a bottom location on the alignment pin, or the two or more locations can be at a left and a right location on the alignment pin. In certain examples, the flexing of the resilient spring elements may be substantially parallel to a plane formed by the minor side of the connector body, or may be substantially parallel to a plane formed by the major side of the connector body. In certain examples, each alignment pin can have its own separate pin retaining portion.

In certain examples, a tool can be used to move each resilient spring element from the pin retaining position to the pin release position without requiring the fiber optic connector to be disassembled. In certain example, tool access openings for access the resilient spring elements with a tool are defined though minor sides of the connector body of the fiber optic connector. In certain examples, the tool access openings are exposed when the outer grip-sleeve is in a rear position relative to the connector body, and are covered when the outer grip-sleeve is in a forward position relative to the connector body. In certain examples, open tool paths exists within the connector body between the side tool access openings and the resilient spring elements. In examples where the pin retaining portions of the resilient spring elements fit within the circumferential retention grooves of the alignment pins at the inner sides of the alignment pins, the open tool paths can extend above or below only one of the alignment pins. For example, the open tool path corresponding to a left one of the resilient spring elements extends through the left side of the connector body and over or under the left alignment pin before reaching the left one of the resilient spring elements. Similarly, the open tool path corresponding to a right one of the resilient spring elements extends through the right side of the connector body and over or under the right alignment pin before reaching the right one of the resilient spring elements. In examples where the pin retaining portions of the resilient spring elements fit within the circumferential retention grooves of the alignment pins at the outer sides of the alignment pins, the open tool paths can extend above or below both of the left and right alignment pins. For example, the open tool path corresponding to a left one of the resilient spring elements extends through the right side of the connector body and across the width of the connector body over or under the right and left alignment pins before reaching the left one of the resilient spring elements. Similarly, the open tool path corresponding to a right one of the resilient spring elements extends through the left side of the connector body and across the width of the connector body over or under the left and right alignment pins before reaching the right one of the resilient spring elements.

What is claimed is:

1. A fiber optic connector comprising:

a connector body having opposite front and rear ends, the connector body also including opposite upper and lower major sides that extend lengthwise between the front and rear ends, the connector body further including opposite left and right minor sides that extend between the upper and lower major sides and also extend lengthwise between the front and rear ends, the connector body defining a longitudinal axis that extends between the front and rear ends, the left and right minor sides respectively defining left and right adapter latch receptacles, and the left and right minor sides also respectively defining left and right spring grooves having open sides that respectively face in left and right directions;

a multi-fiber ferrule positioned within the connector body adjacent the front end, the multi-fiber ferrule having an elongate transverse cross-sectional profile defining perpendicular major and minor dimensions, the major dimension extending between the left and right minor sides of the connector body and the minor dimension extending between the upper and lower major sides, the multi-fiber ferrule defining a plurality of fiber openings for receiving optical fibers, at least some of the fiber openings being arranged in a row that extends along the major dimension of the multi-fiber ferrule, the multi-fiber ferrule being moveable relative to the connector body along the longitudinal axis of the connector body;

a spring stop mounted within the rear end of the connector body;

a ferrule spring for biasing the multi-fiber ferrule in a forward direction relative to the connector body, the ferrule spring being located within the connector body and being captured between the spring stop and the multi-fiber ferrule;

an outer grip-sleeve assembly including:
a main grip-sleeve body mounted on the connector body, the main grip-sleeve body including upper and lower major sides that respectively oppose the upper and lower major sides of the connector body, the main grip-sleeve body also including left and right minor sides that respectively oppose the left and right minor sides of the connector body, the main grip-sleeve body being moveable relative to the connector body along the longitudinal axis of the connector body between a forward position and a rearward position;
left and right adapter latch locks respectively mounted at the left and right minor sides of the main grip-sleeve body, the left and right adapter latch locks being moveable along the longitudinal axis relative to the main grip-sleeve body between forward positions and rearward positions, the left and right adapter latch locks being separate pieces that are moveable relative to each other along the longitudinal axis of the connector body, the left and right adapter latch locks each including a cover portion, the cover portions of the left and right adapter latch locks being positioned within the main grip-sleeve body, the cover portions of the left and right adapter latch locks covering the adapter latch receptacles when the main grip-sleeve body is in the forward position and the left and right adapter latch locks are in the forward positions, the cover portions of the left and right adapter latch locks being rearwardly displaced from the adapter latch receptacles when the main grip-sleeve body is in the forward position and the left and right adapter latch locks are in the rearward positions, and the cover portions of the left and right adapter latch locks being rearwardly displaced from the adapter latch receptacles when the main grip-sleeve body is in the rearward position and the left and right adapter latch locks are in the forward positions; and left and right grip-sleeve assembly springs respectively mounted in the left and right spring grooves of the connector body, the left and right grip-sleeve assembly springs respectively biasing the left and right adapter latch locks toward the forward positions relative to the main grip-sleeve body, the left and right grip-sleeve assembly springs also biasing the main grip-sleeve body toward the forward position.

2. The fiber optic connector of claim 1, wherein the left and right grip-sleeve assembly springs bias the main grip-sleeve body toward the forward position via contact between the left and right adapter latch locks and the main grip-sleeve body.

3. The fiber optic connector of claim 1, wherein the left and right spring grooves have forward and rearward ends that oppose forward and rearward ends of the left and right grip-sleeve assembly springs.

4. The fiber optic connector of claim 3, wherein the forward and rearward ends of the left and right spring grooves function as spring stops.

5. The fiber optic connector of claim 3, wherein the left and right adapter latch locks include top-hat structures including upper and lower stop tabs, wherein the top-hat structures also define spring channels having open rear ends and forward ends closed by forward spring stops, wherein the forward spring stops of the top-hat structures of the left and right adapter latch locks oppose and are respectively contacted by the forward ends of the left and right grip-sleeve assembly springs, and wherein the upper and lower stop tabs engage front stops on the main grip-sleeve body to stop a forward movement of the left and right adapter latch locks relative to the main grip-sleeve body.

6. The fiber optic connector of claim 5, wherein when the left and right adapter latch locks are in the forward positions relative to the main grip-sleeve body and the main grip-sleeve body is in the forward position relative to the connector body, the forward spring stops of the left and right adapter latch locks align with the forward ends of the left and right spring grooves.

7. The fiber optic connector of claim 5, wherein the left and right adapter latch locks include elongate portions that are positioned within guide channels defined within the main grip-sleeve body, wherein the elongate portion of the left adapter latch lock slides between the left minor side of the connector body and the main grip-sleeve body when the left adapter lock moves between the forward and rearward positions relative to the main grip-sleeve body, and wherein the elongate portion of the right adapter latch lock slides between the right minor side of the connector body and the main grip-sleeve body when the right adapter lock moves between the forward and rearward positions relative to the main grip-sleeve body.

8. The fiber optic connector of claim 7, wherein the elongate portions of the left and right adapter latch locks cover the left and right grip-sleeve assembly springs so as to contain the left and right grip-sleeve assembly springs within the left and right spring grooves of the connector body.

9. The fiber optic connector of claim 5, wherein the upper and lower stop tabs engage rear stops on the connector body to stop rearward movement of the outer grip-sleeve assembly relative to the connector body.

10. The fiber optic connector of claim 5, wherein when the main grip-sleeve body is moved from the forward position toward the rearward position relative to the connector body while the left and right adapter latch locks are in the forward positions relative to the main grip-sleeve body, contact between the upper and lower stop tabs and the front stops of the main grip-sleeve body causes the left and right adapter latch locks to be moved rearwardly with the main grip-sleeve body.

11. The fiber optic connector of claim 1, wherein the spring stop includes retention legs that snap within retention openings defined through the minor sides of the connector body, wherein the cover portions of the left and right adapter latch locks define access openings, and wherein when the main grip-sleeve body is moved to the rearward position relative to the connector body the access openings align with the retention openings.

12. The fiber optic connector of claim 11, wherein the retention openings coincide with portions of the left and right spring grooves of the connector body.

13. A fiber optic connector comprising:

a connector body having opposite front and rear ends, the connector body also including opposite upper and lower major sides that extend lengthwise between the front and rear ends, the connector body further including opposite left and right minor sides that extend between the upper and lower major sides and also extend lengthwise between the front and rear ends, the connector body defining a longitudinal axis that extends between the front and rear ends, the left and right minor sides respectively defining left and right adapter latch receptacles;

a multi-fiber ferrule positioned within the connector body adjacent the front end, the multi-fiber ferrule having an elongate transverse cross-sectional profile defining perpendicular major and minor dimensions, the major dimension extending between the left and right minor sides of the connector body and the minor dimension extending between the upper and lower major sides, the multi-fiber ferrule defining a plurality of fiber openings for receiving optical fibers, at least some of the fiber openings being arranged in a row that extends along the major dimension of the multi-fiber ferrule, the multi-fiber ferrule being moveable relative to the connector body along the longitudinal axis of the connector body;

a spring stop mounted within the rear end of the connector body;

a ferrule spring for biasing the multi-fiber ferrule in a forward direction relative to the connector body, the ferrule spring being located within the connector body and being captured between the spring stop and the multi-fiber ferrule;

a main grip-sleeve body mounted on the connector body, the main grip-sleeve body including upper and lower major sides that respectively oppose the upper and lower major sides of the connector body, the main grip-sleeve body also including left and right minor sides that respectively oppose the left and right minor sides of the connector body, the main grip-sleeve body being moveable relative to the connector body along the longitudinal axis of the connector body between a forward position and a rearward position;

the upper major side of the connector body defining an upper key latch receptacle covered by the upper major side of the main grip-sleeve body, and the lower major side of the connector body defining a lower key latch receptacle covered by the lower major side of the main grip-sleeve body;

an upper key mounted at the upper major side of the connector body, the upper key including front and rear key latches spaced-apart from one another along the longitudinal axis of the connector body, the upper key being moveable along the longitudinal axis between an extended position where the rear key latch is received within the upper key latch receptacle and a retracted position where the front key latch is received within the upper key latch receptacle;

a lower key mounted at the lower major side of the connector body, the lower key including front and rear key latches spaced-apart from one another along the longitudinal axis of the connector body, the lower key being moveable along the longitudinal axis between an extended position where the rear key latch is received within the lower key latch receptacle and a retracted position where the front key latch is received within the lower key latch receptacle;

the main grip-sleeve body including an upper latch blocking surface that covers the upper key latch receptacle to provide key latch retention within the upper key latch receptacle when the main grip-sleeve body is in the forward position relative to the connector body and that is rearwardly offset from the upper key latch receptacle to allow key latch disengagement from the upper key latch receptacle when the main grip-sleeve body is in the rearward position relative to the connector body; and the main grip-sleeve body including a lower latch blocking surface that covers the lower key latch receptacle to provide key latch retention within the lower key latch receptacle when the main grip-sleeve body is in the forward position relative to the connector body and that is rearwardly offset from the lower key latch receptacle to allow key latch disengagement from the lower key latch receptacle when the main grip-sleeve body is in the rearward position relative to the connector body, wherein the front and rear key latches of the upper and lower keys are flexible cantilever latches, and wherein the flexible cantilever latches are configured to flex in a direction that is towards or away from the upper and lower major sides of the connector body when the front or rear key latch of the upper or lower key is being received within the respective upper or lower key latch receptacle.

14. The fiber optic connector of claim 13, wherein the upper and lower keys are connected to the connector body by dovetail interfaces that allow the upper and lower keys to be slid longitudinally relative to the connector body.

15. The fiber optic connector of claim 13, wherein the main grip-sleeve body defines upper and lower viewing windows respectively at the upper and lower major sides of the main grip-sleeve body, wherein the upper key is visible through the upper viewing window when in the retracted position and is not visible through the upper viewing window when in the extended position, and wherein the lower key is visible through the lower viewing window when in the retracted position and is not visible through the lower viewing window when in the extended position.

16. A fiber optic connector comprising:
a connector body having opposite front and rear ends, the connector body also including opposite upper and lower major sides that extend lengthwise between the front and rear ends, the connector body further including opposite left and right minor sides that extend between the upper and lower major sides and also extend lengthwise between the front and rear ends, the connector body defining a central longitudinal axis that extends between the front and rear ends, the left and right minor sides respectively defining left and right adapter latch receptacles;

a multi-fiber ferrule positioned within the connector body adjacent the front end, the multi-fiber ferrule having an elongate transverse cross-sectional profile defining perpendicular major and minor dimensions, the major dimension extending between the left and right minor sides of the connector body and the minor dimension extending between the upper and lower major sides, the multi-fiber ferrule defining a plurality of fiber openings for receiving optical fibers, at least some of the fiber openings being arranged in a row that extends along the major dimension of the multi-fiber ferrule, the multi-fiber ferrule being moveable relative to the connector body along the longitudinal axis of the connector body, the multi-fiber ferrule defining left and right alignment pin openings that extend along the central longitudinal axis of the connector body when the multi-fiber ferrule is positioned within the connector body;

a spring stop mounted within the rear end of the connector body;

a ferrule spring for biasing the multi-fiber ferrule in a forward direction relative to the connector body, the ferrule spring being located within the connector body and being captured between the spring stop and the multi-fiber ferrule;

a main grip-sleeve body mounted on the connector body, the main grip-sleeve body including upper and lower major sides that respectively oppose the upper and lower major sides of the connector body, the main grip-sleeve body also including left and right minor sides that respectively oppose the left and right minor sides of the connector body, the main grip-sleeve body being moveable relative to the connector body along the longitudinal axis of the connector body between a forward position and a rearward position;

left and right alignment pins mountable in the left and right alignment pin openings of the multi-fiber ferrule, wherein when the left and right alignment pins are mounted within the multi-fiber ferrule within the connector body, the left and right alignment pins include inner surfaces that face towards each other and toward the central longitudinal axis, and the left and right alignment pins also include outer surfaces that face away from one another and away from the central longitudinal axis, the left and right alignment pins further including circumferential retention grooves defined adjacent rear ends of the left and right alignment pins;

a pin retention structure positioned at a rear end of the multi-fiber ferrule for retaining the left and right alignment pins within the left and pin alignment pin openings, the pin retention structure including:
a main pin-holder body;

left and right spring elements for respectively retaining the left and right alignment pins in the left and right alignment pin openings, the left and right spring elements including pin retaining portions, the left and right spring elements being moveable relative to the main pin-holder body between pin retaining positions and pin release positions, the left and right spring elements being spring biased toward the pin retaining positions, the pin retaining portions of the left and right spring elements being positioned and configured to fit within the circumferential retention grooves of the alignment pins when the alignment pins are installed within the alignment pin openings, the pin retaining portions being adapted to fit within the circumferential retention grooves at the outer surfaces of the alignment pins, wherein the left and right spring elements flex outwardly relative to the central longitudinal axis to move from the pin retaining positions to the pin release positions, and wherein the left and right spring elements include release tabs that project higher or lower than corresponding upper or lower sides of the main pin-holder body.

17. The fiber optic connector of claim 16, wherein the fiber optic connector includes a first tool path that extends across a width of the fiber optic connector from a left tool access opening at the left minor side of the connector body, over or under the main pin-holder body, to the release tab of the right spring element, and wherein the fiber optic connector includes a second tool path that extends across the width of the fiber optic connector from a right tool access opening at the right minor side of the connector body, over or under the main pin-holder body, to the release tab of the left spring element.

18. The fiber optic connector of claim 17, wherein the left and right tool access openings are defined through the adapter latch receptacles of the connector body.

19. The fiber optic connector of claim 16, wherein the main pin-holder body has a front side and a rear side, and wherein the left and right spring elements are cantilevers having base ends unitary with the rear side of the main pin-holder body and free ends positioned adjacent the front side of the main pin-holder body, wherein the release tabs are positioned adjacent the free ends, and wherein the pin retaining portions are positioned adjacent the free ends.

20. A fiber optic connector comprising:
a connector body having opposite front and rear ends, the connector body also including opposite upper and lower major sides that extend lengthwise between the front and rear ends, the connector body further including opposite left and right minor sides that extend between the upper and lower major sides and also extend lengthwise between the front and rear ends, the connector body defining a central longitudinal axis that extends between the front and rear ends, the left and right minor sides respectively defining left and right adapter latch receptacles wherein a left tool access opening is defined at the left minor side and a right tool access opening is defined at the right minor side;
a multi-fiber ferrule positioned within the connector body adjacent the front end, the multi-fiber ferrule having an elongate transverse cross-sectional profile defining perpendicular major and minor dimensions, the major dimension extending between the left and right minor sides of the connector body and the minor dimension extending between the upper and lower major sides, the multi-fiber ferrule defining a plurality of fiber openings for receiving optical fibers, at least some of the fiber openings being arranged in a row that extends along the major dimension of the multi-fiber ferrule, the multi-fiber ferrule being moveable relative to the connector body along the longitudinal axis of the connector body, the multi-fiber ferrule defining left and right alignment pin openings that extend along the central longitudinal axis of the connector body when the multi-fiber ferrule is positioned within the connector body;
a spring stop mounted within the rear end of the connector body;
a ferrule spring for biasing the multi-fiber ferrule in a forward direction relative to the connector body, the ferrule spring being located within the connector body and being captured between the spring stop and the multi-fiber ferrule;
a main grip-sleeve body mounted on the connector body, the main grip-sleeve body including upper and lower major sides that respectively oppose the upper and lower major sides of the connector body, the main grip-sleeve body also including left and right minor sides that respectively oppose the left and right minor sides of the connector body, the main grip-sleeve body being moveable relative to the connector body along the longitudinal axis of the connector body between a forward position and a rearward position;
left and right alignment pins mountable in the left and right alignment pin openings of the multi-fiber ferrule, wherein when the left and right alignment pins are mounted within the multi-fiber ferrule within the connector body, the left and right alignment pins include inner surfaces that face towards each other and toward the central longitudinal axis, and the left and right alignment pins also include outer surfaces that face away from one another and away from the central longitudinal axis, the left and right alignment pins further including circumferential retention grooves defined adjacent rear ends of the left and right alignment pins;
a pin retention structure positioned at a rear end of the multi-fiber ferrule for retaining the left and right alignment pins within the left and pin alignment pin openings, the pin retention structure including:
a main pin-holder body including left and right pin openings extending axially through the main pin-holder body adapted to receive the rear ends of the left and right alignment pins, left and right side notches adjacent the left and right pin openings adapted to provide open tool paths, and left and right tool stops extending within the left and right side notches outside the left and right pin openings relative to the central longitudinal axis;
left and right spring elements for respectively retaining the left and right alignment pins in the left and right alignment pin openings, the left and right spring elements including pin retaining portions, the left and right spring elements being moveable relative to the main pin-holder body between pin retaining positions and pin release positions, the left and right spring elements being spring biased toward the pin retaining positions, the pin retaining portions of the left and right spring elements being positioned and configured to fit within the circumferential retention grooves of the alignment pins when the alignment pins are installed within the alignment pin openings, the pin retaining portions being adapted to fit within the circumferential retention grooves at the inner surfaces of the alignment pins, wherein the left and right spring elements flex inwardly toward the central longitudinal axis to move from the pin retaining positions to the pin release positions, and wherein the left and right spring elements have lengths that extend in an upward or downward direction across lengths of the alignment pins, and wherein the pin retaining portions are offset relative to the left and right tool access openings of the connector body along the longitudinal axis such that to align the pin retaining portions with the left and right tool access openings, the pin retention structure is moved rearward relative to the connector body against the bias of the ferrule spring.

21. The fiber optic connector of claim 20, wherein the main pin-holder body has a molded plastic construction with a front side and a rear side, and wherein the left and right spring elements are formed by a U-shaped metal clip that mounts at the front side of the main pin-holder body.

22. The fiber optic connector of claim 21, wherein the metal clip includes a base portion that extends across a width of the fiber optic connector, and wherein the left and right spring elements are defined by left and right legs that project upwardly or downwardly from opposite ends of the base portion.

23. The fiber optic connector of claim 20, wherein the fiber optic connector includes a first tool path from the left tool access opening at the left minor side of the connector body, laterally through a left portion of the main pin-holder body, over or under the left alignment pin to the left spring element, and wherein the fiber optic connector includes a second tool path from the right tool access opening at the right minor side of the connector body, laterally through a right portion of the main pin-holder body, over or under the right alignment pin to the right spring element.

24. The fiber optic connector of claim 23, wherein the left and right tool access openings are defined through the adapter latch receptacles of the connector body.

\* \* \* \* \*